US008363027B2

(12) United States Patent
Hotelling et al.

(10) Patent No.: US 8,363,027 B2
(45) Date of Patent: Jan. 29, 2013

(54) INTEGRATED TOUCH SCREEN

(75) Inventors: Steven Porter Hotelling, Los Gatos, CA (US); Marduke Yousefpor, San Jose, CA (US); Shih Chang Chang, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/527,470

(22) Filed: Jun. 19, 2012

(65) Prior Publication Data

US 2012/0262406 A1 Oct. 18, 2012

Related U.S. Application Data

(63) Continuation of application No. 12/545,649, filed on Aug. 21, 2009, now Pat. No. 8,217,913.

(60) Provisional application No. 61/156,463, filed on Feb. 27, 2009, provisional application No. 61/149,340, filed on Feb. 2, 2009.

(51) Int. Cl.
G09G 5/00 (2006.01)

(52) U.S. Cl. .......................................... 345/173; 345/90

(58) Field of Classification Search ............ 345/87, 345/88, 90, 103, 104, 173–179; 178/18.01, 178/18.03, 18.05, 18.06; 349/12
See application file for complete search history.

(56) References Cited

U.S. PATENT DOCUMENTS

| | | |
|---|---|---|
| 4,916,308 A | 4/1990 | Meadows |
| 5,105,186 A | 4/1992 | May |
| 5,483,261 A | 1/1996 | Yasutake |
| 5,488,204 A | 1/1996 | Mead et al. |
| 5,589,856 A | 12/1996 | Stein et al. |
| 5,606,346 A | 2/1997 | Kai et al. |
| 5,825,352 A | 10/1998 | Bisset et al. |
| 5,835,079 A | 11/1998 | Shieh |
| 5,838,308 A | 11/1998 | Knapp et al. |
| 5,880,411 A | 3/1999 | Gillespie et al. |
| 6,057,903 A | 5/2000 | Colgan et al. |
| 6,177,918 B1 | 1/2001 | Colgan et al. |
| 6,188,391 B1 | 2/2001 | Seely et al. |
| 6,204,897 B1 | 3/2001 | Colgan et al. |
| 6,310,610 B1 | 10/2001 | Beaton et al. |
| 6,323,846 B1 | 11/2001 | Westerman et al. |
| 6,380,931 B1 | 4/2002 | Gillespie et al. |
| 6,483,498 B1 | 11/2002 | Colgan et al. |
| 6,501,529 B1 | 12/2002 | Kurihara et al. |
| 6,586,101 B2 | 7/2003 | Chu |
| 6,680,448 B2 | 1/2004 | Kawashima et al. |

(Continued)

FOREIGN PATENT DOCUMENTS

| | | |
|---|---|---|
| CN | 1800923 A | 7/2006 |
| CN | 1875312 A | 12/2006 |

(Continued)

OTHER PUBLICATIONS

Chinese Search Report mailed Mar. 23, 2011, for CN Application No. 2009201531939, with English Translation, 10 pages.

(Continued)

*Primary Examiner* — Regina Liang
(74) *Attorney, Agent, or Firm* — Morrison & Foerster LLP

(57) ABSTRACT

Displays with touch sensing circuitry integrated into the display pixel stackup are provided. An integrated touch screen can include multi-function circuit elements that can operate as circuitry of the display system to generate an image on the display, and can also form part of a touch sensing system that senses one or more touches on or near the display. The multi-function circuit elements can be, for example, capacitors in display pixels that can be configured to operate as storage capacitors/electrodes, common electrodes, conductive wires/pathways, etc., of the display circuitry in the display system, and that may also be configured to operate as circuit elements of the touch sensing circuitry.

23 Claims, 31 Drawing Sheets

U.S. PATENT DOCUMENTS

| | | | |
|---|---|---|---|
| 6,690,387 | B2 | 2/2004 | Zimmerman et al. |
| 6,778,163 | B2 | 8/2004 | Ozawa |
| 7,015,894 | B2 | 3/2006 | Morohoshi |
| 7,042,444 | B2 | 5/2006 | Cok |
| 7,133,032 | B2 | 11/2006 | Cok |
| 7,184,064 | B2 | 2/2007 | Zimmerman et al. |
| 7,202,856 | B2 | 4/2007 | Cok |
| 7,230,608 | B2 | 6/2007 | Cok |
| 7,280,167 | B2 | 10/2007 | Choi et al. |
| 7,379,054 | B2 | 5/2008 | Lee et al. |
| 7,482,187 | B2 | 1/2009 | Shibusawa et al. |
| 7,605,864 | B2 | 10/2009 | Takahashi et al. |
| 7,663,607 | B2 | 2/2010 | Hotelling et al. |
| 7,705,834 | B2 | 4/2010 | Swedin |
| 7,859,521 | B2 | 12/2010 | Hotelling et al. |
| 7,880,703 | B2 | 2/2011 | Park et al. |
| 7,995,041 | B2 | 8/2011 | Chang |
| 8,217,913 | B2 | 7/2012 | Hotelling et al. |
| 2001/0040665 | A1 | 11/2001 | Ahn |
| 2002/0084992 | A1 | 7/2002 | Agnew |
| 2003/0234769 | A1 | 12/2003 | Cross et al. |
| 2004/0141096 | A1 | 7/2004 | Mai |
| 2004/0189587 | A1 | 9/2004 | Jung et al. |
| 2005/0052582 | A1 | 3/2005 | Mai |
| 2005/0179668 | A1 | 8/2005 | Edwards |
| 2005/0231487 | A1 | 10/2005 | Ming |
| 2005/0243023 | A1 | 11/2005 | Reddy et al. |
| 2006/0007165 | A1 | 1/2006 | Yang et al. |
| 2006/0026521 | A1 | 2/2006 | Hotelling et al. |
| 2006/0097991 | A1 | 5/2006 | Hotelling et al. |
| 2006/0109222 | A1 | 5/2006 | Lee et al. |
| 2006/0145365 | A1 | 7/2006 | Halls et al. |
| 2006/0146033 | A1 | 7/2006 | Chen et al. |
| 2006/0146034 | A1 | 7/2006 | Chen et al. |
| 2006/0197753 | A1 | 9/2006 | Hotelling |
| 2006/0244736 | A1 | 11/2006 | Tseng |
| 2006/0262100 | A1 | 11/2006 | Van Berkel |
| 2007/0018969 | A1 | 1/2007 | Chen et al. |
| 2007/0040814 | A1 | 2/2007 | Lee et al. |
| 2007/0075977 | A1 | 4/2007 | Chen et al. |
| 2007/0176905 | A1 | 8/2007 | Shih et al. |
| 2007/0216657 | A1 | 9/2007 | Konicek |
| 2007/0222762 | A1 | 9/2007 | Van Delden et al. |
| 2007/0252801 | A1 | 11/2007 | Park et al. |
| 2007/0262967 | A1 | 11/2007 | Rho |
| 2007/0279395 | A1 | 12/2007 | Philipp et al. |
| 2008/0048994 | A1 | 2/2008 | Lee et al. |
| 2008/0055221 | A1 | 3/2008 | Yabuta et al. |
| 2008/0055268 | A1 | 3/2008 | Yoo et al. |
| 2008/0062139 | A1 | 3/2008 | Hotelling et al. |
| 2008/0062140 | A1 | 3/2008 | Hotelling et al. |
| 2008/0062147 | A1 | 3/2008 | Hotelling et al. |
| 2008/0062148 | A1 | 3/2008 | Hotelling et al. |
| 2008/0067528 | A1 | 3/2008 | Choi et al. |
| 2008/0074401 | A1 | 3/2008 | Chung et al. |
| 2008/0129898 | A1 | 6/2008 | Moon |
| 2008/0136980 | A1 | 6/2008 | Rho et al. |
| 2008/0150901 | A1 | 6/2008 | Lowles et al. |
| 2008/0158118 | A1 | 7/2008 | Ono et al. |
| 2008/0186288 | A1 | 8/2008 | Chang |
| 2008/0195180 | A1 | 8/2008 | Stevenson et al. |
| 2008/0273000 | A1 | 11/2008 | Park et al. |
| 2008/0278178 | A1 | 11/2008 | Philipp |
| 2008/0278458 | A1 | 11/2008 | Masuzawa et al. |
| 2008/0309627 | A1 | 12/2008 | Hotelling et al. |
| 2008/0309631 | A1 | 12/2008 | Westerman |
| 2009/0096760 | A1 | 4/2009 | Ma et al. |
| 2009/0237369 | A1 | 9/2009 | Hur et al. |
| 2010/0001973 | A1 | 1/2010 | Hotelling et al. |
| 2010/0194697 | A1 | 8/2010 | Hotelling et al. |
| 2010/0194699 | A1 | 8/2010 | Chang |
| 2010/0194707 | A1 | 8/2010 | Chang |

FOREIGN PATENT DOCUMENTS

| | | |
|---|---|---|
| CN | 1942853 A | 4/2007 |
| CN | 1959481 A | 5/2007 |
| EP | 1 192 585 A1 | 4/2002 |
| EP | 1 192 585 B1 | 4/2002 |
| EP | 1 422 601 | 5/2004 |
| EP | 1 455 264 A2 | 9/2004 |
| EP | 1 455 264 A3 | 9/2004 |
| JP | 7-110742 A | 4/1995 |
| JP | 2000-163031 A | 6/2000 |
| JP | 2002-342033 A | 11/2002 |
| JP | 2005-523496 A | 8/2005 |
| JP | 2006-064769 A | 3/2006 |
| JP | 2006-344163 A | 12/2006 |
| JP | 2008-281616 A | 11/2008 |
| KR | 10-2006-0073590 A | 6/2006 |
| WO | WO-95/27334 A1 | 10/1995 |
| WO | WO-2005/015373 A2 | 2/2005 |
| WO | WO-2005/015373 A3 | 2/2005 |
| WO | WO-2005/101178 A2 | 10/2005 |
| WO | WO-2005/101178 A3 | 10/2005 |
| WO | WO-2005/114369 A2 | 12/2005 |
| WO | WO-2005/114369 A3 | 12/2005 |
| WO | WO-2007/146779 A2 | 12/2007 |
| WO | WO-2007/146779 A3 | 12/2007 |
| WO | WO-2007/146780 A2 | 12/2007 |
| WO | WO-2007/146780 A3 | 12/2007 |
| WO | WO-2007/146783 A2 | 12/2007 |
| WO | WO-2007/146783 A3 | 12/2007 |
| WO | WO-2010/002929 A2 | 1/2010 |
| WO | WO-2010/088666 A1 | 8/2010 |
| WO | WO-2010/088670 A1 | 8/2010 |

OTHER PUBLICATIONS

Chinese Search Report completed Dec. 16, 2011, for CN Application No. ZL2010201083672, filed Feb. 2, 2010 with English Translation, 15 pages.

Chinese Search Report completed Mar. 27, 2012, for CN Application No. ZL2010201083672, filed Feb. 2, 2010, with English Translation, 16 pages.

European Search Report mailed Jul. 6, 2010, for EP Application No. 10151966.8, seven pages.

European Search Report mailed Dec. 9, 2010, for EP Application No. 09164196.9, filed Jun. 30, 2009, six pages.

European Search Report mailed Oct. 4, 2011, for EP Application No. 09164196.9, filed Jun. 30, 2009, 11 pages.

Final Office Action mailed May 15, 2012, for U.S. Appl. No. 12/240,964, filed Sep. 29, 2008, 39 pages.

International Search Report mailed Mar. 17, 2010, for PCT Application No. PCT/US10/22883, filed Feb. 2, 2010, one page.

International Search Report mailed Jun. 25, 2010, for PCT Application No. PCT/US10/22888, filed Feb. 2, 2010, two pages.

International Search Report mailed Mar. 15, 2011, for PCT Application No. PCT/US2009/049313, filed Jun. 30, 2009, seven pages.

Kanda, E. et al. (2008). "55.2: Integrated Active Matrix Capacitive Sensors for Touch Panel LTPS-TFT LCDs," *SID 08 Digest*, pp. 834-837.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Sep. 15, 2011, for U.S. Appl. No. 12/545,649, filed Aug. 21, 2009, nine pages.

Non-Final Office Action mailed Nov. 9, 2011, for US Patent Application No. 12/240,964, filed Sep. 29, 2008, 27 pages.

Notice of Allowance mailed Jun. 10, 2010, for U.S. Appl. No. 12/756,834, filed Apr. 8, 2010, six pages.

Notice of Allowance mailed Jul. 7, 2010, for U.S. Appl. No. 12/558,488, filed Sep. 11, 2009, six pages.

Notice of Allowance mailed Mar. 12, 2012, for U.S. Appl. No. 12/545,649, filed Aug. 21, 2009, seven pages.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Supplemental Notice of Allowability mailed May 19, 2011, for U.S. Appl. No. 12/558,488, filed Sep. 11, 2009, 10 pages. (includes Notice of Allowance mailed May 6, 2011.).

U.S. Appl. No. 12/240,964, filed Sep. 29, 2008, entitled: "Display with Dual-Function Capacitive Elements," by Hotelling et al., now U.S. Patent Publication No. 2010/0001973, and in particular, Figures 1-3 and paragraphs 78-90.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

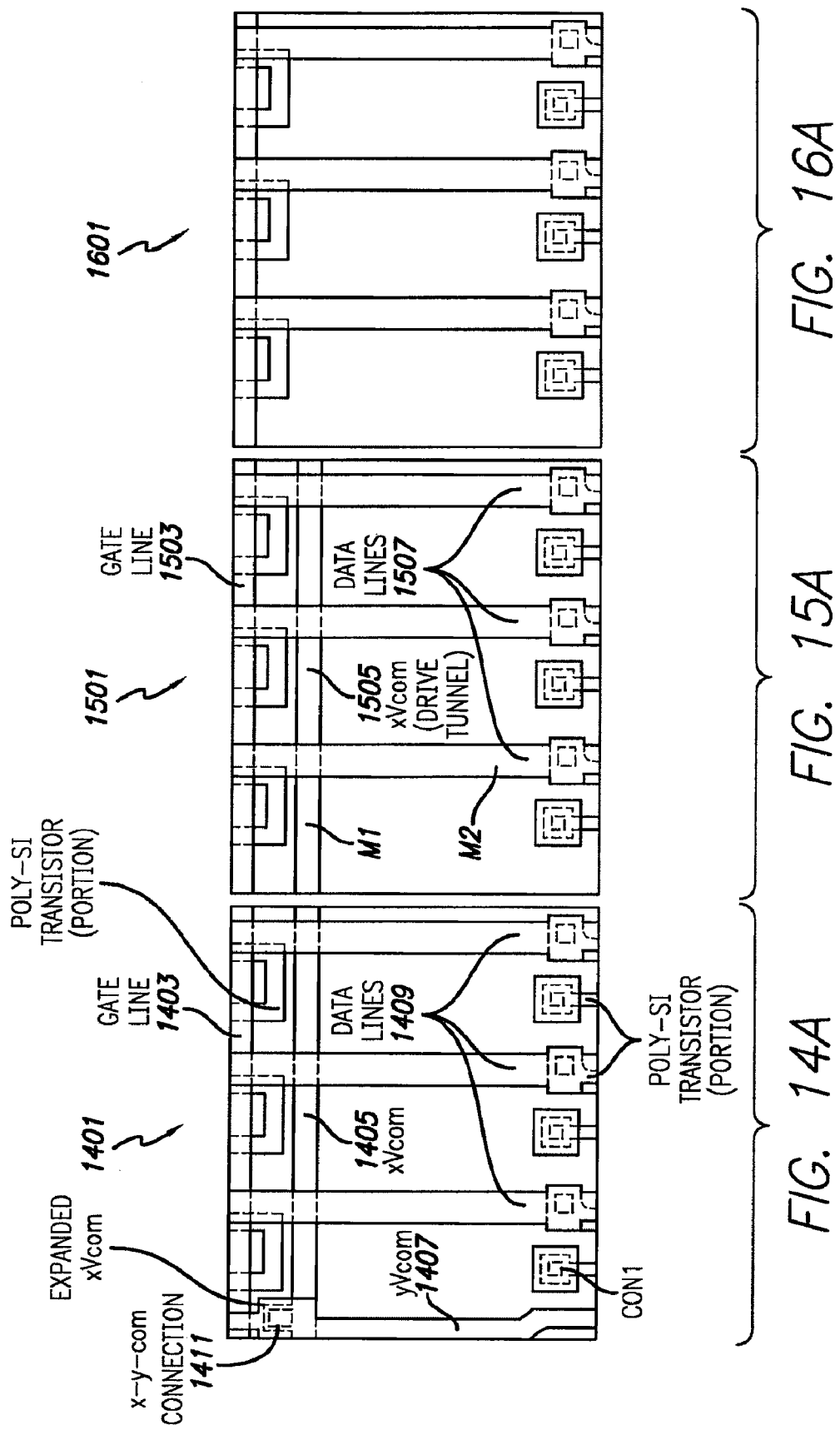

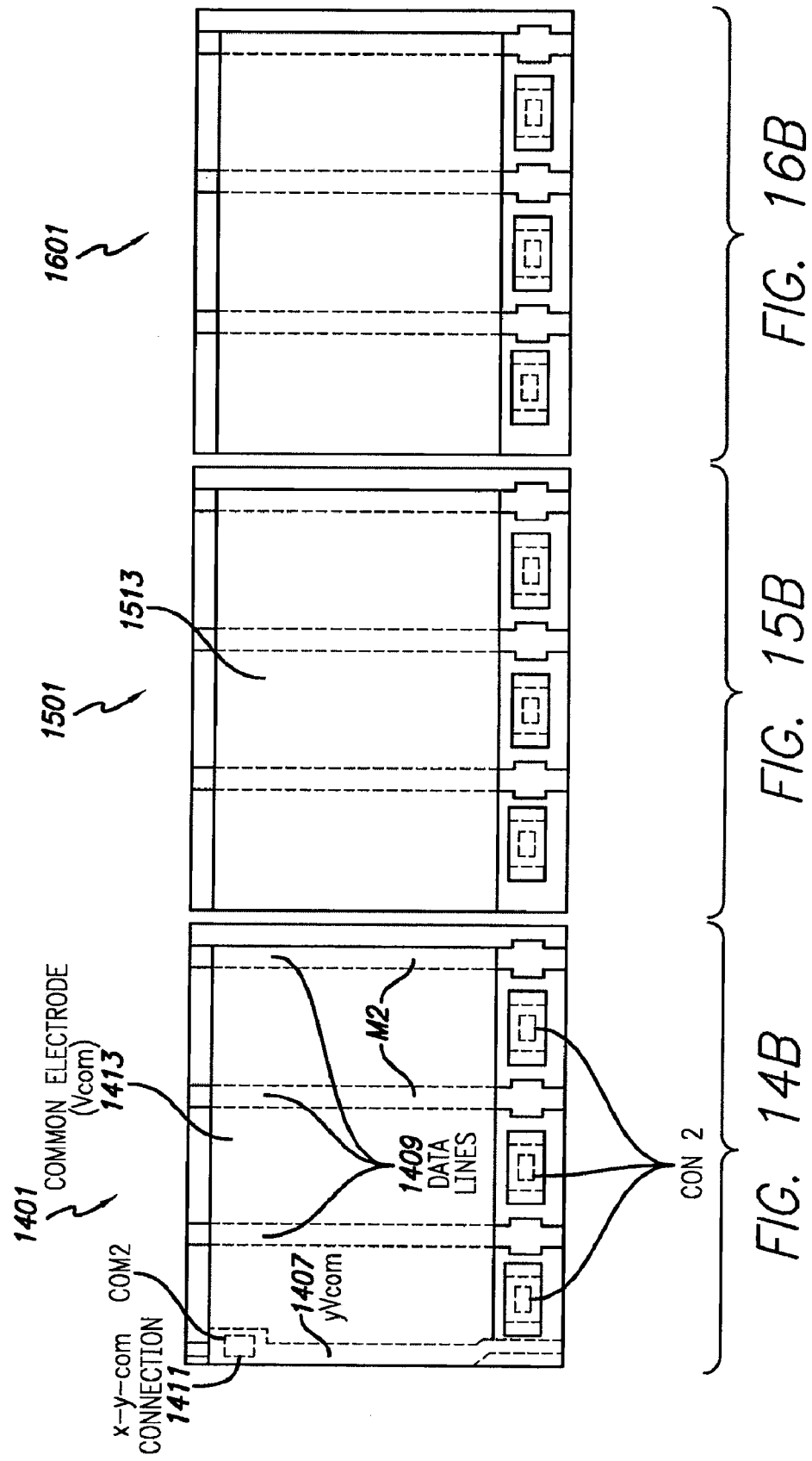

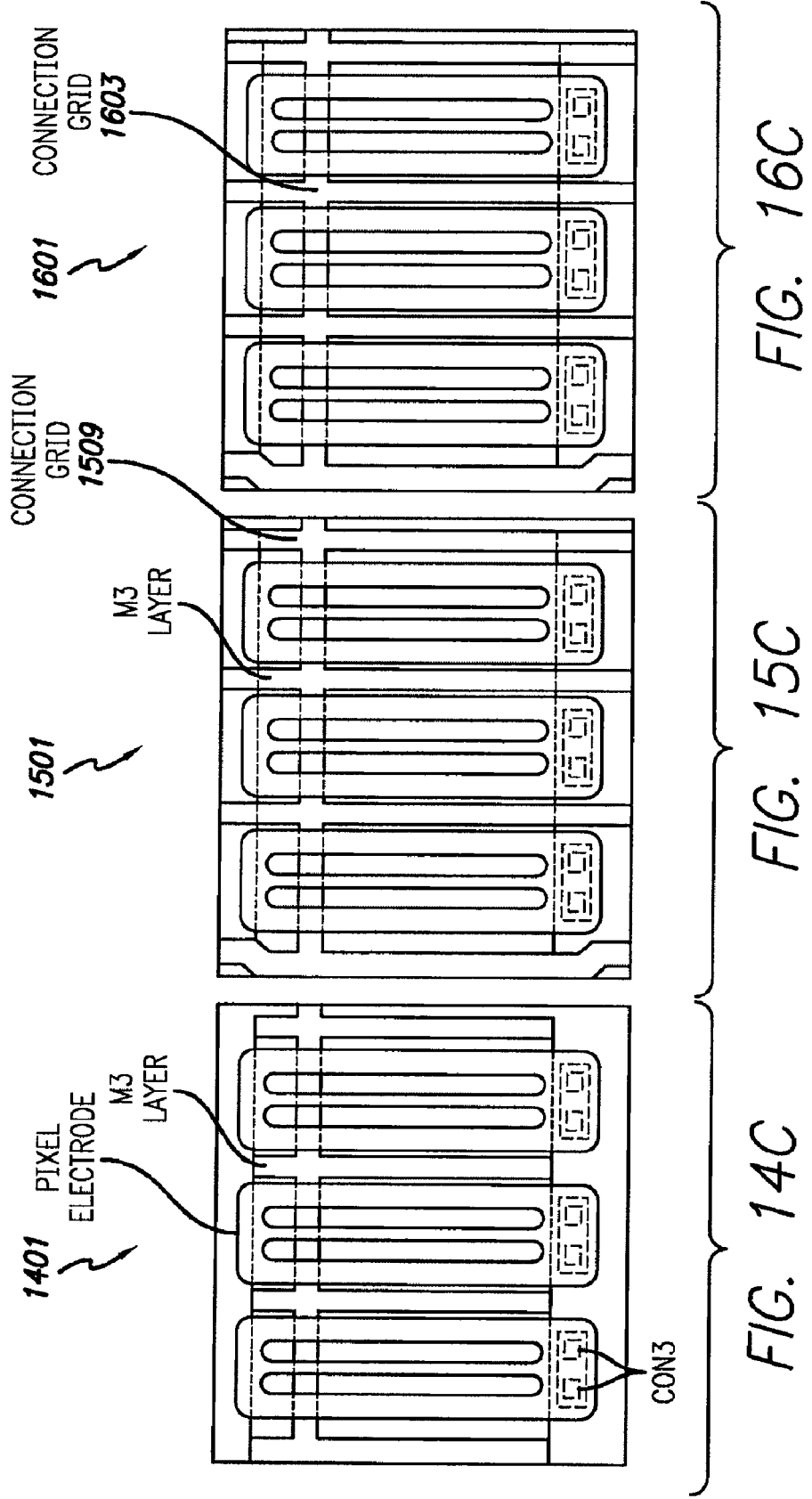

INTEGRATED TOUCH SCREEN

CROSS REFERENCE TO RELATED APPLICATIONS

This application is a continuation of U.S. patent application Ser. No. 12/545,649, filed Aug. 21, 2009, which claims benefit of U.S. Provisional Application No. 61/156,463, filed Feb. 27, 2009, and U.S. Provisional Application No. 61/149,340, filed Feb. 2, 2009, the contents of which are incorporated by reference herein in their entirety for all purposes.

FIELD OF THE DISCLOSURE

This relates generally to displays including display pixel stackups, and more particularly to touch sensing circuitry integrated into the display pixel stackup of a display.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. However, overlaying a display with a touch sensor panel can have drawbacks, such as added weight and thickness, additional power required to drive the touch sensor panel, and decreased brightness of the display.

SUMMARY

This relates to touch sensing circuitry integrated into the display pixel stackup (i.e., the stacked material layers forming the display pixels) of a display, such as an LCD display. Circuit elements in the display pixel stackups can be grouped together to form touch sensing circuitry that senses a touch on or near the display. Touch sensing circuitry can include, for example, touch signal lines, such as drive lines and sense lines, grounding regions, and other circuitry. An integrated touch screen can include multi-function circuit elements that can form part of the display circuitry designed to operate as circuitry of the display system to generate an image on the display, and can also form part of the touch sensing circuitry of a touch sensing system that senses one or more touches on or near the display. The multi-function circuit elements can be, for example, capacitors in display pixels of an LCD that can be configured to operate as storage capacitors/electrodes, common electrodes, conductive wires/pathways, etc., of the display circuitry in the display system, and that may also be configured to operate as circuit elements of the touch sensing circuitry. In this way, for example, in some embodiments a display with integrated touch sensing capability may be manufactured using fewer parts and/or processing steps, and the display itself may be thinner, brighter, and require less power.

BRIEF DESCRIPTION OF THE DRAWINGS

FIGS. 14A-16C illustrate another example configuration of multi-function circuit elements of display pixels according to embodiments of the disclosure.

FIGS. 22-1 and 22-2 illustrate an example touch pixel layout that can include example touch pixels such as those shown in FIG. 21A.

DETAILED DESCRIPTION

Figure 1C:
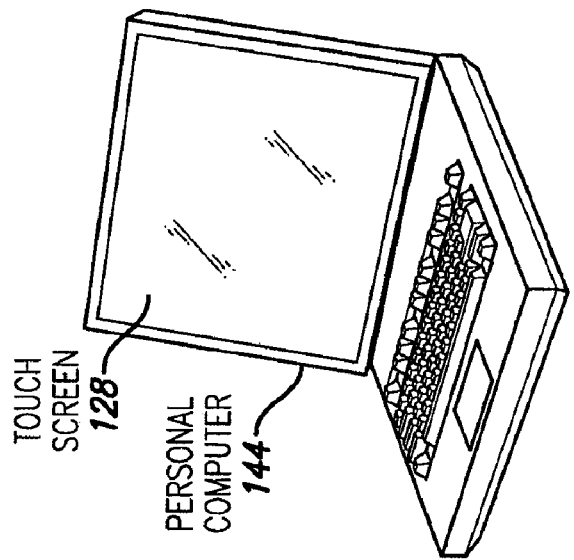
FIGS. 1A-1C illustrate an example mobile telephone, an example digital media player, and an example personal computer that each include an example integrated touch screen according to embodiments of the disclosure.

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples in which touch sensing circuitry can be integrated into the display pixel stackup (i.e., the stacked material layers forming the display pixels) of a display, such as an LCD display. While embodiments herein are described in reference to LCD displays, it is understood that alternative displays may be utilized instead of the LCD display, such as generally any electrically imageable layer containing an electrically imageable material. The electrically imageable material can be light emitting or light modulating. Light emitting materials can be inorganic or organic in nature. Suitable materials can include organic light emitting diodes (OLED) or polymeric light emitting diodes (PLED). The light modulating material can be reflective or transmissive. Light modulating materials can include, without limitation, electrochemical materials, electrophoretic materials such as Gyricon particles, electrochromic materials, or liquid crystal materials. Liquid crystal materials can be, without limitation, twisted nematic (TN), super-twisted nematic (STN), ferroelectric, magnetic, or chiral nematic liquid crystals. Other suitable materials can include thermochromic materials, charged particles, and magnetic particles. Touch sensing circuitry can include, for example, touch signal lines, such as drive lines and sense lines, grounding regions, and other circuitry. Display pixel stackups are typically manufactured by processes including depositing, masking, etching, doping, etc., of materials such as conductive materials (e.g., metal, substantially transparent conductors), semiconductive materials (e.g., polycrystalline silicon (Poly-Si)), and dielectric materials (e.g., SiO2, organic materials, SiNx). Various structures formed within a display pixel stackup can be designed to operate as circuitry of the display system to generate an image on the display. In other words, some of the stackup structures can be circuit elements of the display circuitry. Some embodiments of an integrated touch screen can include multi-function circuit elements that can form part of the display circuitry of the display system, and can also form part of the touch sensing circuitry of a touch sensing system that senses one or more touches on or near the display. The multi-function circuit elements can be, for example, capacitors in display pixels of an LCD that can be configured to operate as storage capacitors/electrodes, common electrodes, conductive wires/pathways, etc., of the display circuitry in the display system, and that may also be configured to operate as circuit elements of the touch sensing circuitry. In this way, for example, in some embodiments a display with integrated touch sensing capability may be manufactured using fewer parts and/or processing steps, and the display itself may be thinner, brighter, and require less power.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the structures to a particular direction or a particular coordinate system. Furthermore, although specific materials and types of materials may be included in the descriptions of example embodiments, one skilled in the art will understand that other materials that achieve the same function can be used. For example, it should be understood that a "metal layer" as described in the examples below can be a layer of any electrically conductive material.

In some example embodiments, an LCD display with integrated touch sensing functionality may include a matrix of voltage data lines to address multi-function circuit elements of the display pixels to display an image during a display phase, and to address the multi-function circuit elements of the display to sense touch during a touch sensing phase. Thus, in some embodiments, the multi-function circuit elements may operate as part of the display system during the display phase, and may operate as part of the touch sensing system during the touch sensing phase. For example, in some embodiments, some of the voltage lines may be driven with a first drive signal to drive the drive regions of the touch screen during the touch sensing phase. In addition, one or more of the voltage lines may be driven with a second drive signal that is 180 degrees out of sync with respect to the first drive signal used to drive the drive regions of the touch screen. These out of sync voltage lines may be used to reduce the static capacitance of the touch screens.

Figure 1B:
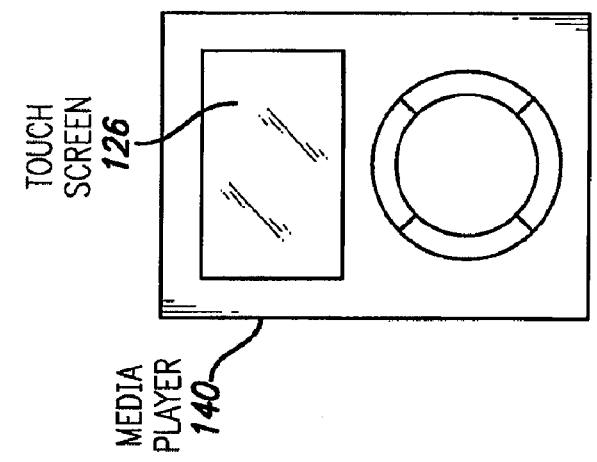
Figure 1A:
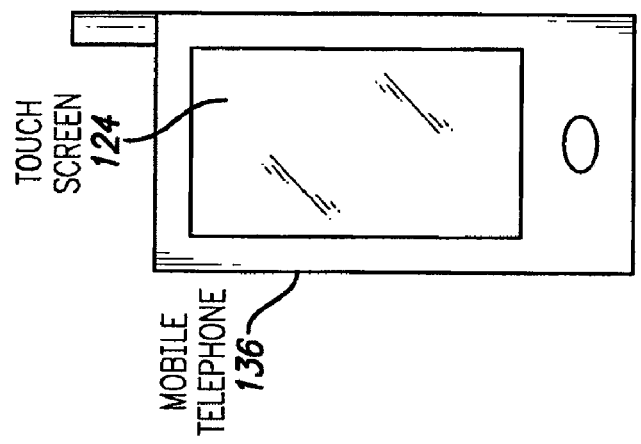

Some of the potential advantages of various embodiments of the disclosure, such as thinness, brightness, and power efficiency, may be particularly useful for portable devices, though use of embodiments of the disclosure is not limited to portable devices. FIGS. 1A-1C show example systems in which an integrated touch screen according to embodiments of the disclosure may be implemented. FIG. 1A illustrates an example mobile telephone 136 that includes an integrated touch screen 124. FIG. 1B illustrates an example digital media player 140 that includes an integrated touch screen 126. FIG. 1C illustrates an example personal computer 144 that includes an integrated touch screen 128.

Figure 1D:
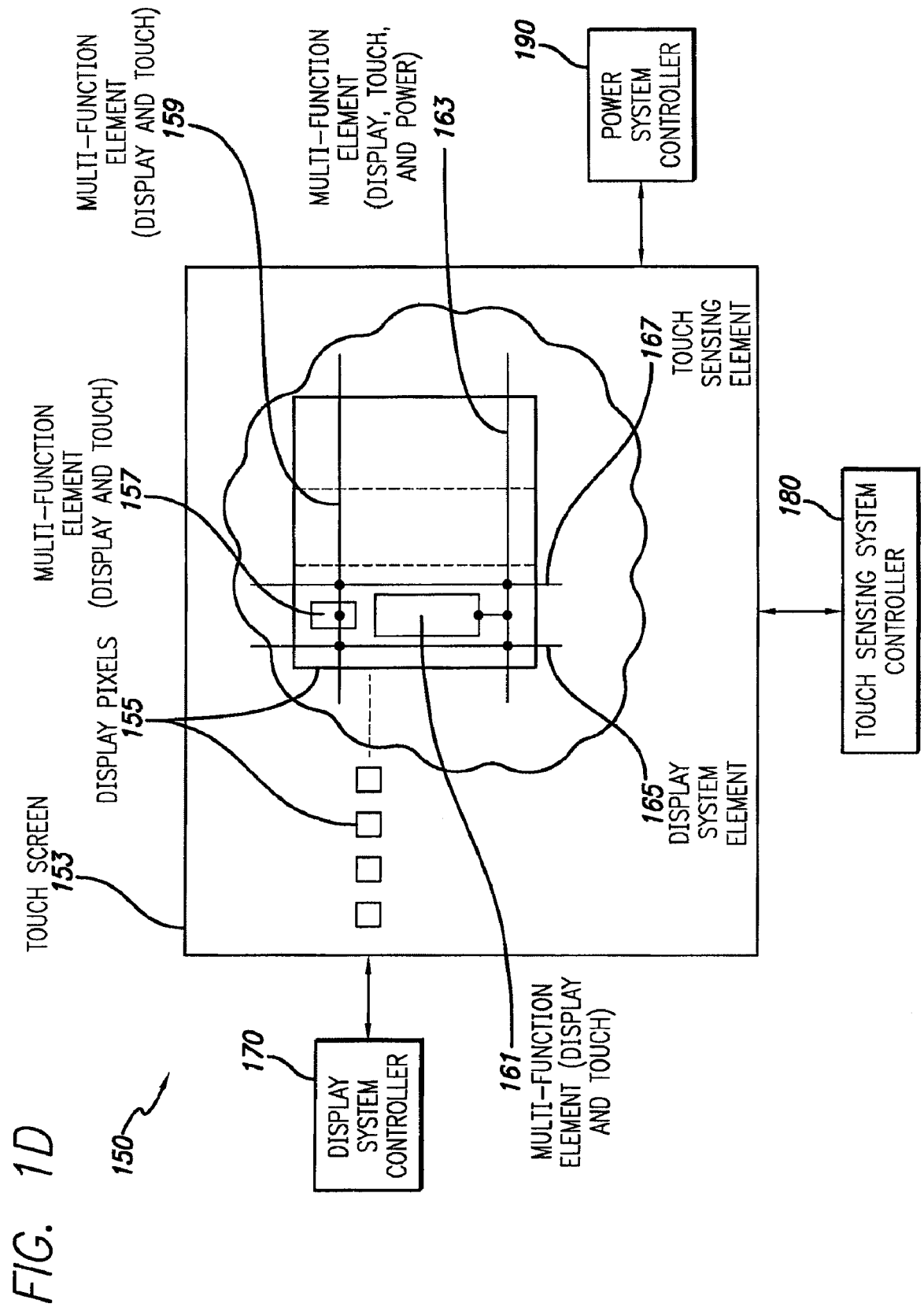
FIGS. 1D-G illustrate an example integrated touch screen system including a touch screen according to embodiments of the disclosure.

FIGS. 1D-G illustrate an example integrated touch screen system 150, including an example integrated touch screen 153, according to embodiments of the disclosure. Referring to FIG. 1D, touch screen 153 includes display pixels 155 that include multi-function circuit elements. FIG. 1D shows a magnified view of one display pixel 155, which includes multi-function circuit elements 157, 159, and 161 that can operate as part of a display system controlled by a display system controller 170 and can operate as part of the touch sensing circuitry of a touch sensing system controlled by a touch sensing system controller 180. Display pixel 155 also includes a multi-function circuit element 163 that can operate as part the display circuitry of the display system, the touch sensing system, and a power system controlled by a power system controller 190. Display pixel 155 also includes a single-function, display circuit element 165 that in some embodiments can operate as part of the display circuitry only, and a single-function, touch sensing circuit element 167 that in some embodiments can operate as part of the touch sensing circuitry only.

Figure 1E:
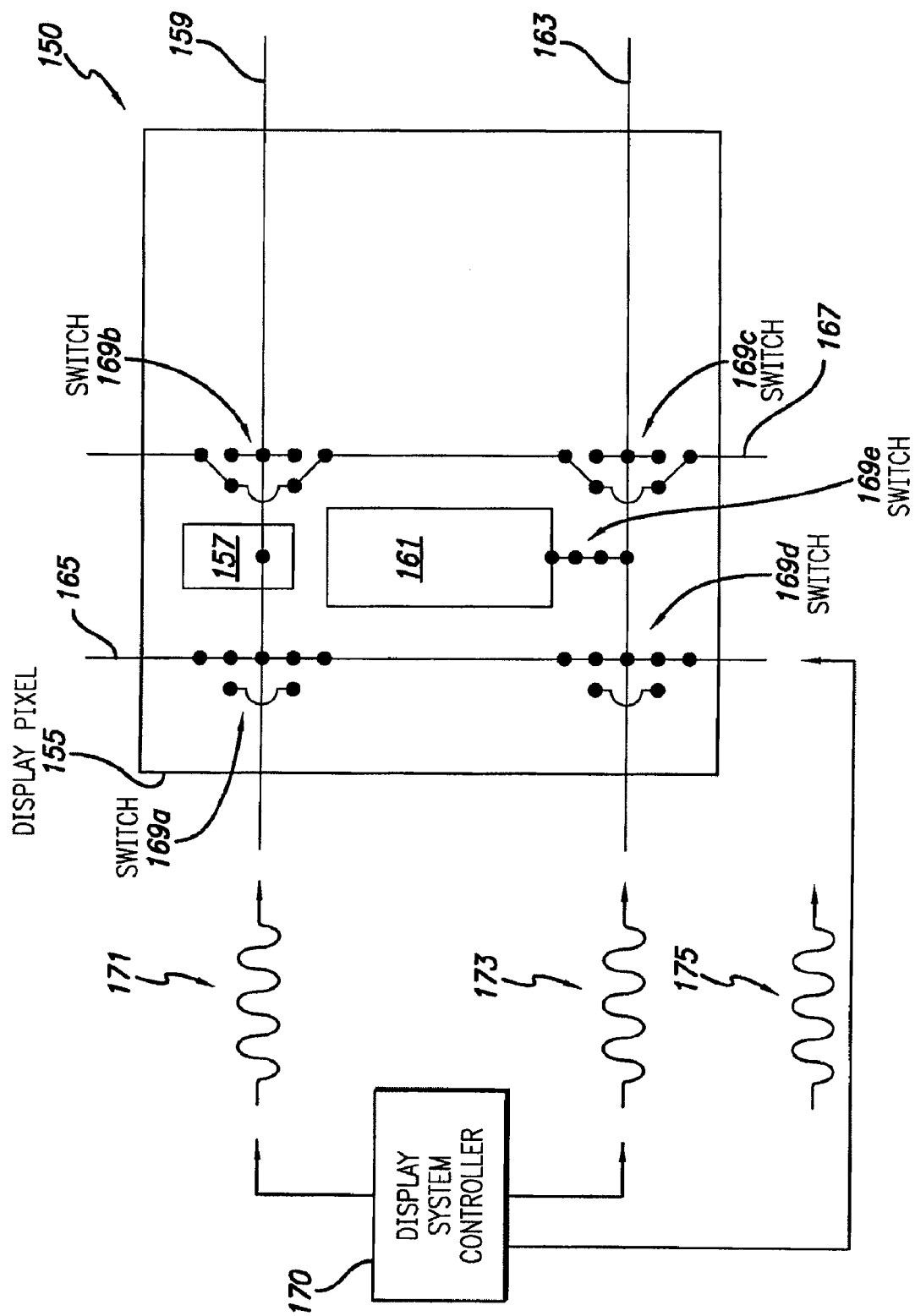
Figure 1F:
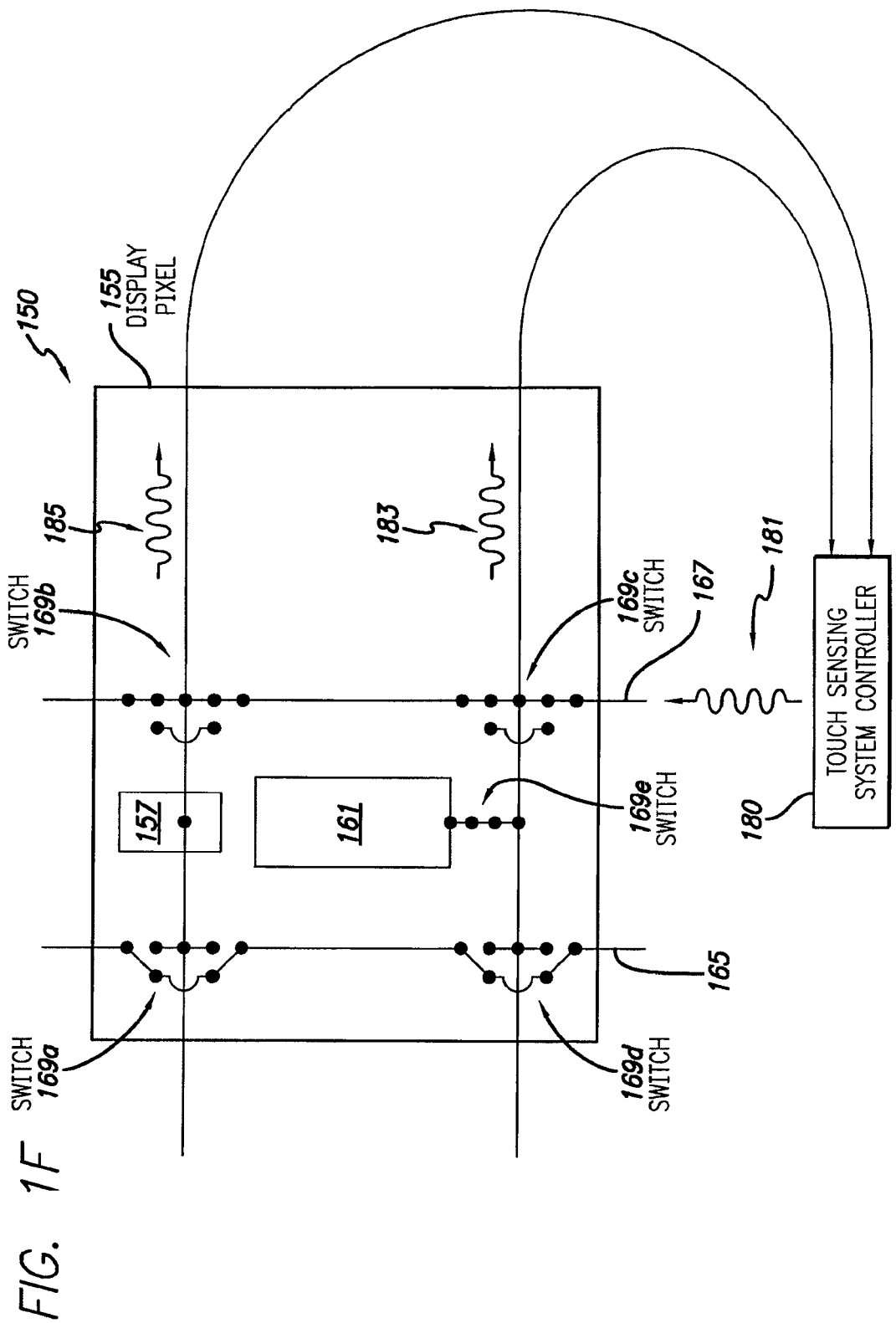
Figure 1G:
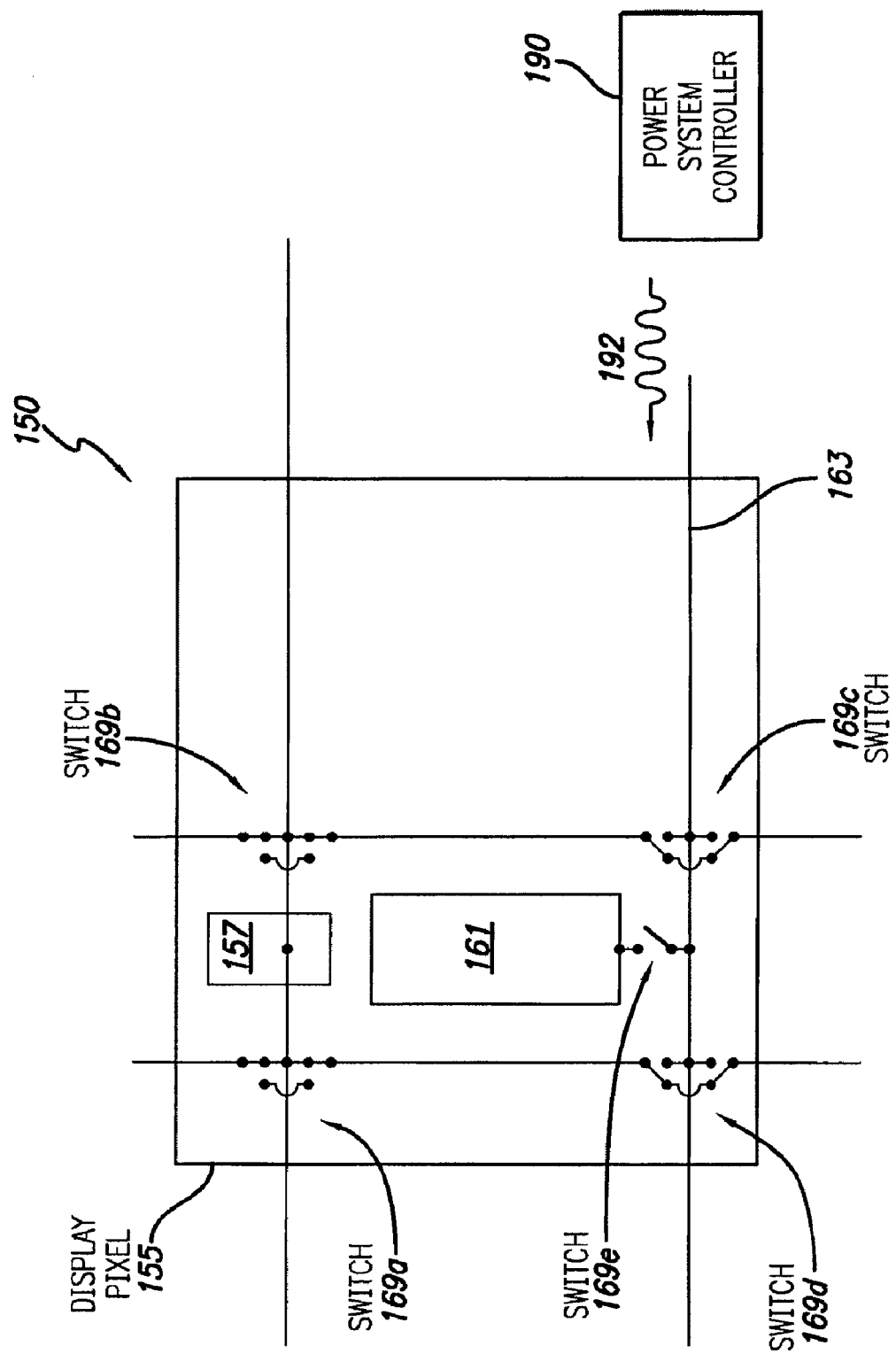

FIGS. 1E-G illustrate an example operation of touch screen system 150, including different phases of operation. FIG. 1E shows an example operation during a display phase, in which circuit elements of display pixel 155 can operate to display an image on touch screen 153. Operation during the display phase can include, for example, actively configuring display pixel 155 into a display configuration by, for example, electrically separating or disconnecting touch sensing circuit element 167 from circuit elements of the display circuitry with switches 169a-e. Actively configuring circuit elements of a display pixel to operate as part of the circuitry of a particular system of an integrated touch screen can include, for example, switching connections between lines of different systems, turning circuit elements on/off, changing voltage levels in voltage lines, changing signals, such as control signals, etc. Active configuration can occur during the operation of the touch screen and can be based at least in part on the static configuration, i.e., the structural configuration, of the touch screen. Structural configuration can include, for example, the size, shape, placement, material composition, etc., of structures in the stackups of the display pixels, such as the number and placement of conductive pathways in the display pixel stackups, permanent connections such as conductor-filled vias connecting contact points of two conductive layers, permanent breaks such as an portion of a conductive pathway in which the conductive material has been removed in the design, etc.

Display system controller 170 can transmit control signals 171, 173, and 175 through multi-function circuit elements 159 and 163, and display system circuit element 165, respectively, to cause multi-function circuit elements 157 and 161 of display pixels 150 to display an image on touch screen 153. In some embodiments, control signals 171, 173, and 175 can be, for example, a gate signal, a Vcom signal, and a data signal.

FIG. 1F shows an example operation during a touch sensing phase, in which circuit elements of display pixel 155 can operate to sense touch, including actively configuring the display pixel for touch sensing by, for example, electrically connecting touch sensing circuit element 167 with switches 169b and 169c, and electrically disconnecting display system circuit element 165 with switches 169a and 169d. Touch sensing system controller 180 can transmit a control signal 181 and can receive information signals 183 and 185. In some embodiments, control signal 181 can be, for example, a drive signal for capacitive sensing, a drive signal for optical sensing, etc. In some embodiments, information signal 183 can be, for example, a sense signal for capacitive, optical, etc. sensing, and information signal 185 can be, for example, a feedback signal of the touch sensing system.

FIG. 1G shows an example operation during a power system phase, in which multi-function circuit element 163 of display pixel 155 can be electrically disconnected from both the display system and the touch sensing system with switches 169c, 169d, and 169e. Power system controller 190 can transmit a signal 192 through multi-function circuit element 163. Signal 192 can be, for example, a signal indicating a recharge state of the power system, a power supply voltage, etc.

In some embodiments of the disclosure, the touch sensing system can be based on capacitance. By detecting changes in capacitance at each of the touch pixels and noting the position of the touch pixels, the touch sensing system can recognize multiple objects, and determine the location, pressure, direction, speed and/or acceleration of the objects as they are moved across the touch screen.

By way of example, some embodiments of an integrated touch sensing system may be based on self capacitance and some embodiments may be based on mutual capacitance. In a self capacitance based touch system, each of the touch pixels can be formed by an individual electrode that forms a self-capacitance to ground. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by the touch sensing system to determine the positions of multiple objects when they touch the touch screen. In a mutual capacitance based touch system, the touch sensing system can include, for example, drive regions and sense regions, such as drive lines and sense lines. In one example case, drive lines can be formed in rows while sense lines can be formed in columns (e.g., orthogonal). The touch pixels can be provided at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, an integrated touch screen can be multi-touch, single touch, projection scan, full-imaging multi-touch, or any capacitive touch.

Figure 2:
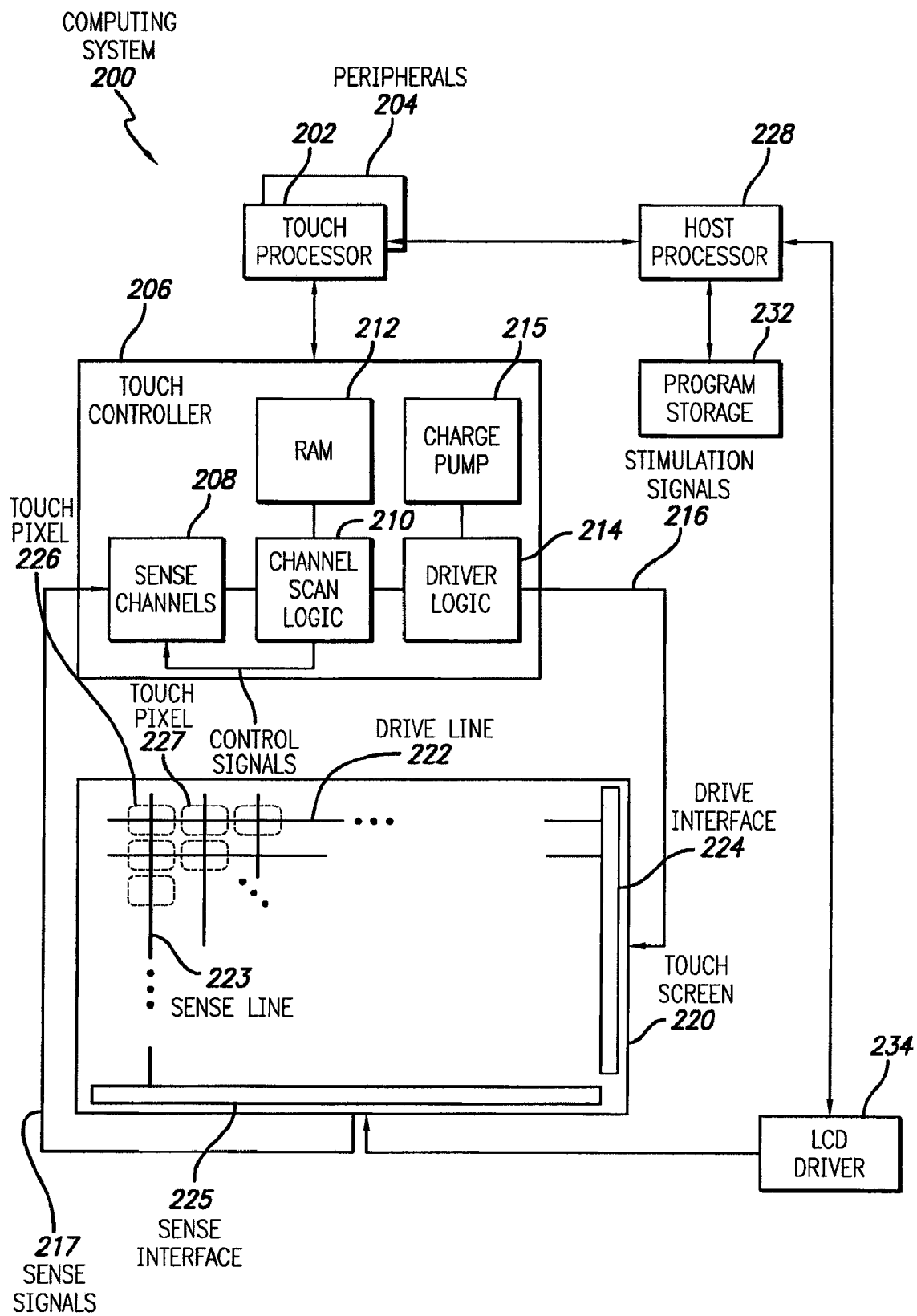
FIG. 2 is a block diagram of an example computing system that illustrates one implementation of an example integrated touch screen according to embodiments of the disclosure.

FIG. 2 is a block diagram of an example computing system 200 that illustrates one implementation of an example integrated touch screen 220 according to embodiments of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some embodiments, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is a sometimes used herein to mean simply conductive pathways, as one skilled in the art will readily understand, and is not limited to structures that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 3:
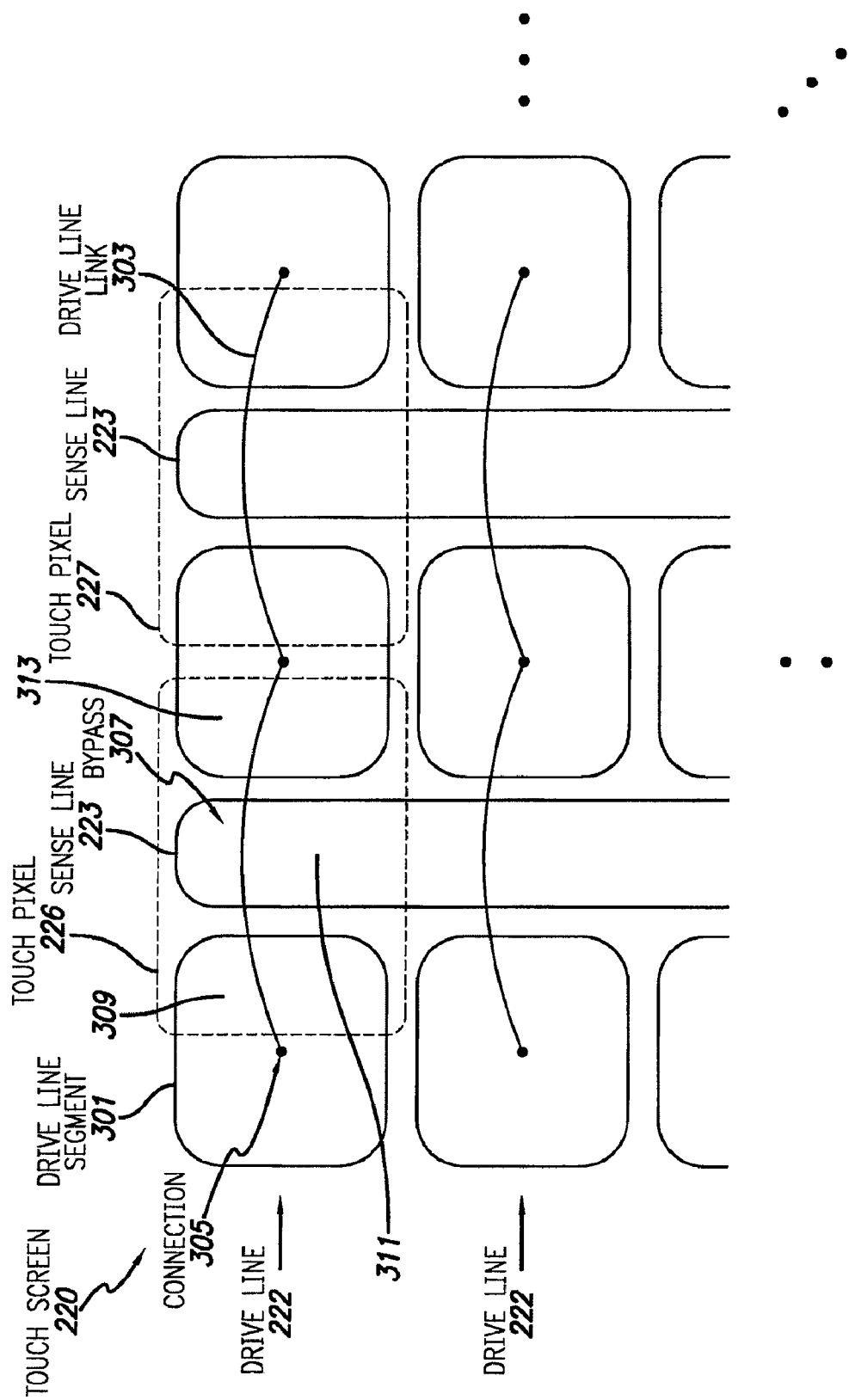
FIG. 3 is a more detailed view of the touch screen of FIG. 2 showing an example configuration of drive lines and sense lines according to embodiments of the disclosure.

FIG. 3 is a more detailed view of touch screen 220 showing an example configuration of drive lines 222 and sense lines 223 according to embodiments of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch pixels such as touch pixels 226 and 227. Drive lines 222 (i.e., drive line segments 301 and corresponding drive line links 303) and sense lines 223 can be formed of electrical circuit elements in touch screen 220. In the example configuration of FIG. 3, each of touch pixels 226 and 227 can includes portion of one drive line segment 301, a portion of a sense line 223, and a portion of another drive line segment 301. For example, touch pixel 226 can include a right-half portion 309 of a drive line segment on one side of a portion 311 of a sense line, and a left-half portion 313 of a drive line segment on the opposite side of portion 311 of the sense line.

Figure 4:
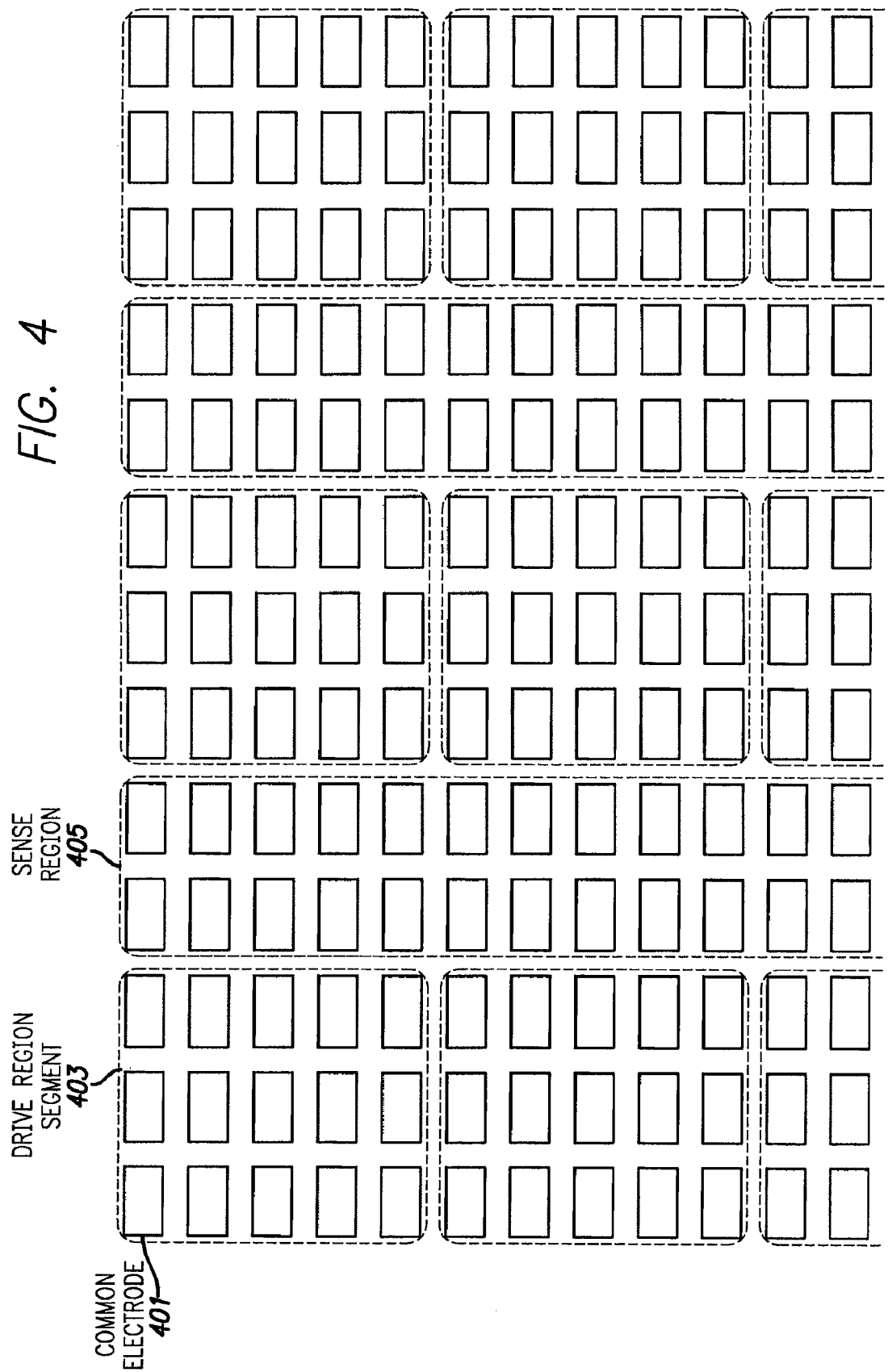
FIG. 4 illustrates an example configuration in which touch sensing circuitry includes common electrodes (Vcom) according to embodiments of the disclosure.

The circuit elements can include, for example, structures that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system according to embodiments of the disclosure. Common electrodes are circuit elements of the display system circuitry in the stackup (i.e., the stacked material layers forming the display pixels) of the display pixels of some types of conventional LCD displays, e.g., fringe field switching (FFS) displays, that can operate as part of the display system to display an image. In the example shown in FIG. 4, a common electrode (Vcom) 401 (e.g., element 161 of FIG. 1D) can serve as a multi-function circuit element that can operate as display circuitry of the display system of touch screen 220 and can also operate as touch sensing circuitry of the touch sensing system. In this example, common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

In addition, although example embodiments herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch phase may operate at different times. Also, although example embodiments herein describe certain circuit elements as being multi-function and other circuit elements as being single-function, it should be understood that the circuit elements are not limited to the particular functionality in other embodiments. In other words, a circuit element that is described in one example embodiment herein as a single-function circuit element may be configured as a multi-function circuit element in other embodiments, and vice versa.

For example, FIG. 4 shows common electrodes 401 grouped together to form drive region segments 403 and sense regions 405 that generally correspond to drive line segments 301 and sense lines 223, respectively. Grouping multi-function circuit elements of display pixels into a region can mean operating the multi-function circuit elements of the display pixels together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

In some embodiments, grouping of circuit elements can be implemented as a layout of display pixels, each display pixel being selected from a set of a limited number of display pixel configurations. In some embodiments, a particular function of touch sensing circuitry may be served by a particular type of display pixel having a configuration that can perform the function. For example, one embodiment described below with reference to FIGS. 17-22 can include display pixels of a type that can connect together one or more adjacent pixels in a connection layer of the stackup, display pixels of a type that can provide a contact to another layer of the stackup, and display pixels of a type that can connect together one or more adjacent pixels in the other layer.

In some embodiments, regions may be reconfigurable, for example, to allow pixels to be grouped into regions of different sizes, shapes, etc. For example, some embodiments may include programmable switching arrays to allow reconfigurable switching schemes to group display pixels into regions of different sizes depending on, for example, variations in environmental noise, size and/or distance of the object to be sensed from the touch screen, etc. Other aspects of configurations that can allow grouping may not be reconfigurable, for example, physical breaks in lines in the stackup of a display pixel are not reconfigurable. However, a touch screen configuration including physical breaks, for example, may still allow reconfigurable grouping of display pixels into differently sized, shaped, etc., regions by including other circuit elements that are reconfigurable, such as programmable switches, signal generators, etc.

Multi-function circuit elements of display pixels of the touch screen can operate in both the display phase and the touch phase. For example, during a touch phase, common electrodes 401 can be grouped together to form touch signal lines, such as drive regions and sense regions. In some embodiments circuit elements can be grouped to form a continuous touch signal line of one type and a segmented touch signal line of another type. For example, FIG. 4 shows one example embodiment in which drive region segments 403 and sense regions 405 correspond to drive line segments 301 and sense lines 223 of touch screen 220. Other configurations are possible in other embodiments, for example, common electrodes 401 could be grouped together such that drive lines are each formed of a continuous drive region and sense lines are each formed of a plurality of sense region segments linked together through connections that bypass a drive region. More details of operations in an example display phase and an example touch phase are described below in reference to FIGS. 11A-B.

The drive regions in the example of FIG. 3 are shown in FIG. 4 as rectangular regions including a plurality of common electrodes of display pixels, and the sense regions of FIG. 3 are shown in FIG. 4 as rectangular regions including a plurality of common electrodes of display pixels extending the vertical length of the LCD. In some embodiments, a touch pixel of the configuration of FIG. 4 can include, for example, a 64×64 area of display pixels. However, the drive and sense regions are not limited to the shapes, orientations, and positions shown, but can include any suitable configurations according to embodiments of the disclosure. It is to be understood that the display pixels used to form the touch pixels are not limited to those described above, but can be any suitable size or shape to permit touch capabilities according to embodiments of the disclosure.

Figure 5:
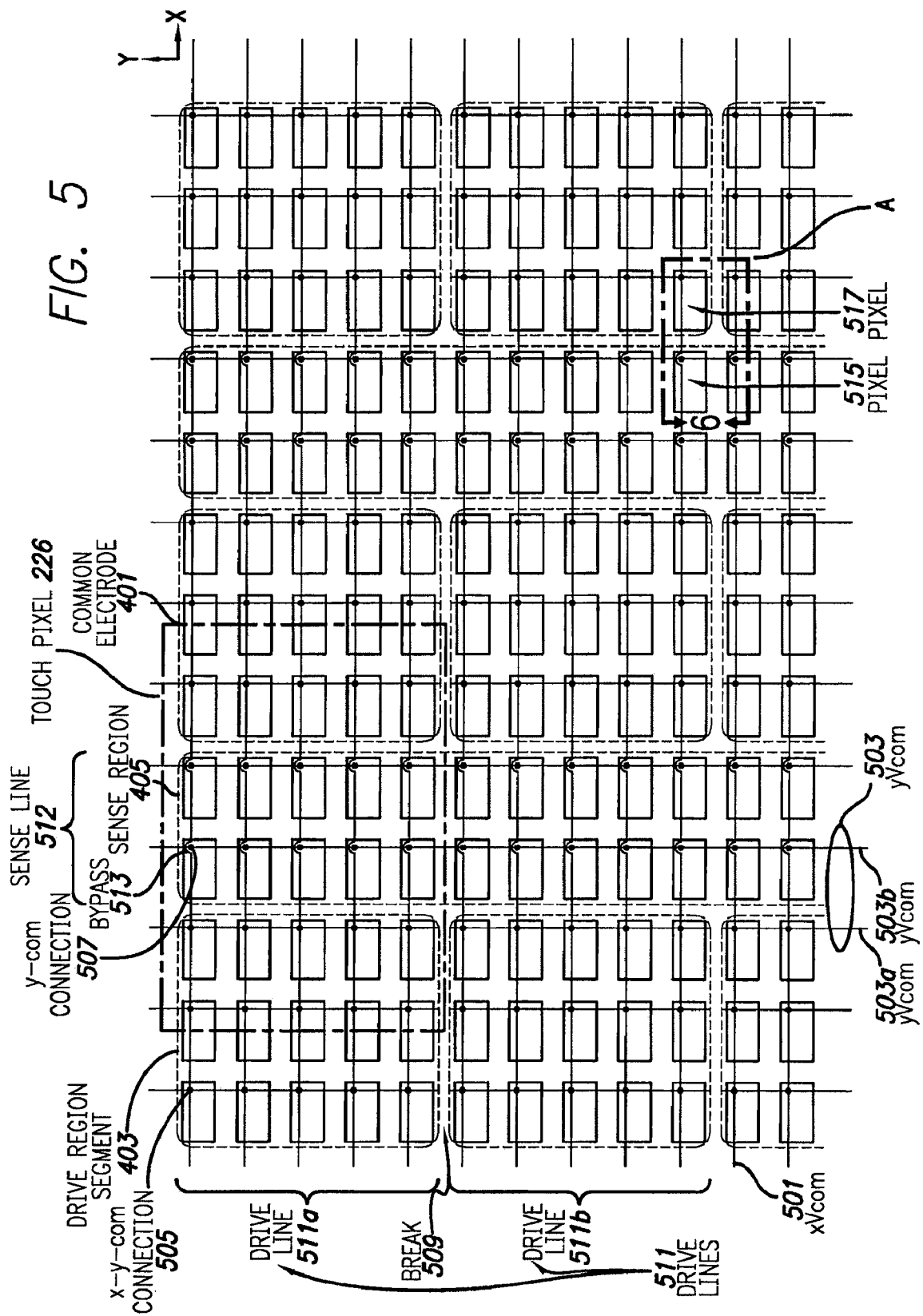
FIG. 5 illustrates an example configuration of conductive lines according to embodiments of the disclosure.

FIG. 5 illustrates an example configuration of conductive lines that can be used to group common electrodes 401 into the regions shown in FIG. 4 and to link drive region segments to form drive lines according to embodiments of the disclosure. Some embodiments can include other regions, such as a grounding region between drive lines and/or between drive lines and sense lines, as illustrated in the example embodiment shown in FIG. 13.

FIG. 5 shows a plurality of xVcom lines 501 along the x-direction and a plurality of yVcom lines 503 along the y-direction. In this embodiment, each row of common electrodes 401 can have a corresponding xVcom line 501 and each column of common electrodes 401 can have a corresponding yVcom line 503. FIG. 5 further shows a plurality of drive region segments 403 (illustrated by dashed lines), where each drive region segment 403 can be formed as a group of common electrodes 401 connected together through x-y-com connections 505, which connect each common electrode to an xVcom line 501 and a yVcom line 503 in the drive region segment, as described in more detail below. The yVcom lines 503 running through the drive region segments 403, such as yVcom line 503a, can include break 509 that provide electrical separation of each drive region segment from other drive region segments (e.g., segments above and below a given drive region segment). Breaks 509 can provide a y-disconnection (an electrical disconnection in the y-direction).

Drive lines 511 can each be formed by a plurality of drive region segments 403 which can be formed by the common electrodes 401 and their interconnecting conducting lines xVcom. Specifically, drive lines 511 can be formed by connecting drive region segments 403 across sense regions 405 using xVcom lines 501. As shown in FIG. 5, a first drive line 511a can be formed by the top row of drive region segments 403, and a next drive line 511b can be formed by the next row of drive region segments 403. The xVcom lines are conductive pathways that bypass the yVcom lines in the sense region 405 using bypasses 513, as described in more detail below.

FIG. 5 further shows a plurality of sense regions 405 (illustrated by dashed lines). Each sense region 405 can be formed as a group of common electrodes 401 connected together through y-com connections 507, which can connect each common electrode of the sense region 405 to one of the yVcom lines 503. Additional connections (see, for example, FIG. 10) can connect together the yVcom lines of each sense region 405. For example, the additional connections can include switches in the border of touch screen 220 that can connect together the yVcom lines of each sense region during the touch phase of operation. The yVcom lines 503 running through the sense regions 405, such as yVcom line 503b, can electrically connect all of the common electrodes 401 in the y-direction, therefore, the yVcom lines of the sense regions do not include breaks. In this way, for example, a sense region can be formed by a plurality of vertical common voltage lines yVcom connected to one another and to circuit elements of corresponding display pixels, thereby forming a sense line 512 consisting of electrically connected circuit elements of display pixels in the sense region. In the example sense region shown in FIG. 5, the vertical common voltage lines yVcom can be unconnected from and can cross over (at 513) the horizontal common voltage lines xVcom to form a structure for capacitive touch sensing. This cross over yVcom and xVcom may also form an additional parasitic capacitance between the sense and drive regions.

Each common electrode 401 can correspond to a display pixel of touch screen 220, such as display pixels 515 and 517. During a display phase, common electrodes 401 an operate along with other display pixel components as display circuitry of the display system of touch screen 220 to display an image on the touch screen. During a touch phase, groups of common electrodes 401 can operate as touch sensing circuitry of the touch sensing system of touch screen 220 to detect one or more touches on or near the touch screen.

In operation during a touch phase, the horizontal common voltage lines xVcom 501 can transmit stimulation signals to stimulate the drive lines 511 and form electric fields between the stimulated drive lines and sense lines 512 to create touch pixels, such as touch pixel 226 in FIG. 3. When an object such as a finger approaches or touches a touch pixel, the object can affect the electric fields extending between the drive line 511 and the sense line 512, thereby reducing the amount of charge capacitively coupled to the sense line. This reduction in charge can be sensed by the sense channel and stored in memory along with similar information of other touch pixels to create an "image" of touch.

In some embodiments, the drive lines and/or sense lines can be formed of other structures including, for example other structures already existing in typical LCD displays (e.g., other electrodes, conductive and/or semiconductive layers, metal lines that would also function as circuit elements in a typical LCD display, for example, carry signals, store voltages, etc.), other structures formed in an LCD stackup that are not typical LCD stackup structures (e.g., other metal lines, plates, whose function would be substantially for the touch sensing system of the touch screen), and structures formed outside of the LCD stackup (e.g., such as external substantially transparent conductive plates, wires, and other structures). For example, part of the touch sensing system can include structures similar to known touch panel overlays. Forming a touch sensing system in part or in whole using structures that already exist in displays can potentially increase the image quality, brightness, etc. of the touch screen by reducing the amount of structure dedicated primarily to touch sensing that would typically overlay the display.

Figure 13A:
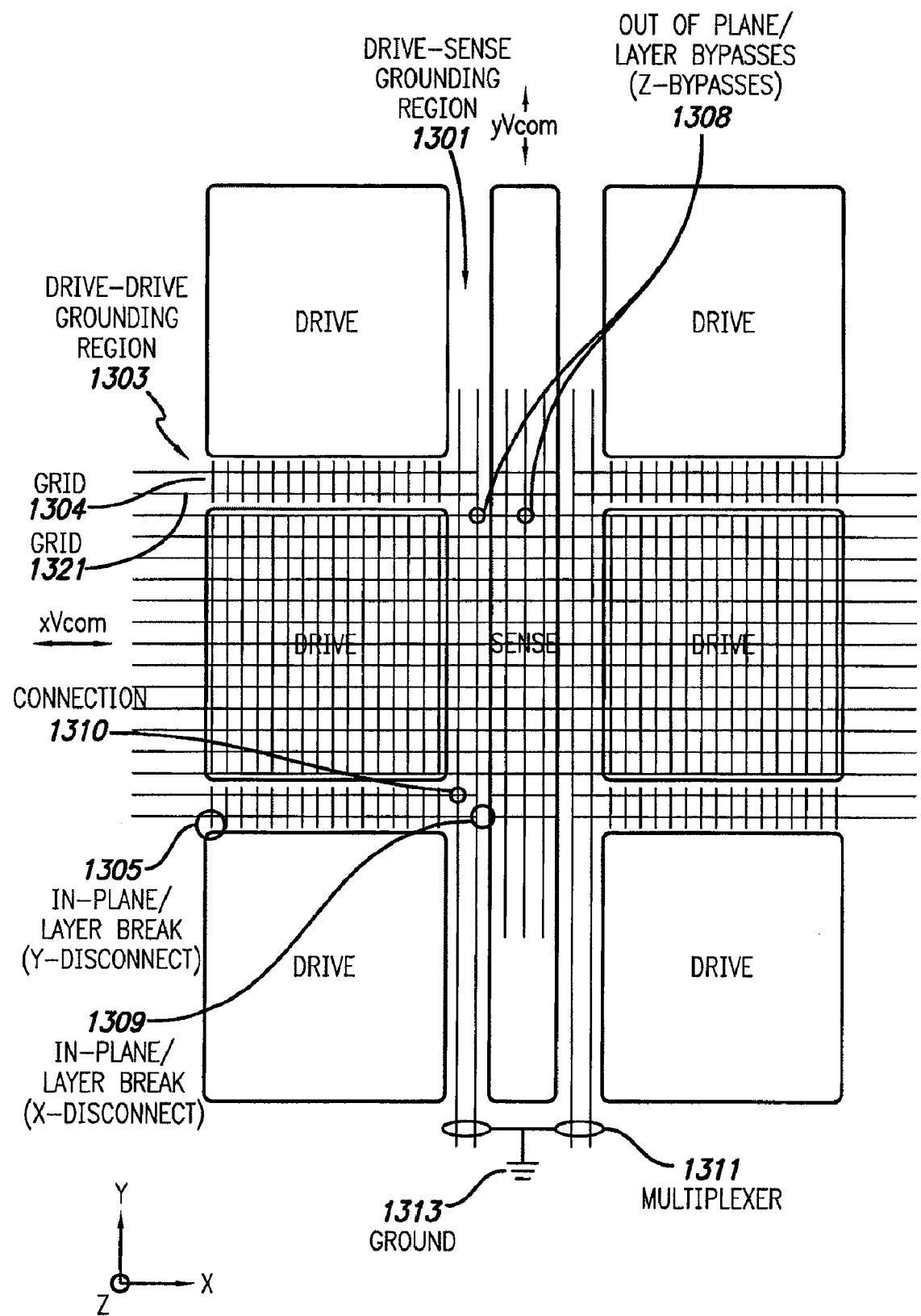
FIGS. 13A-B show another example configuration of multi-function display pixels grouped into regions that function as touch sensing circuitry during a touch phase of a touch screen according to embodiments of the disclosure.
Figure 13B:
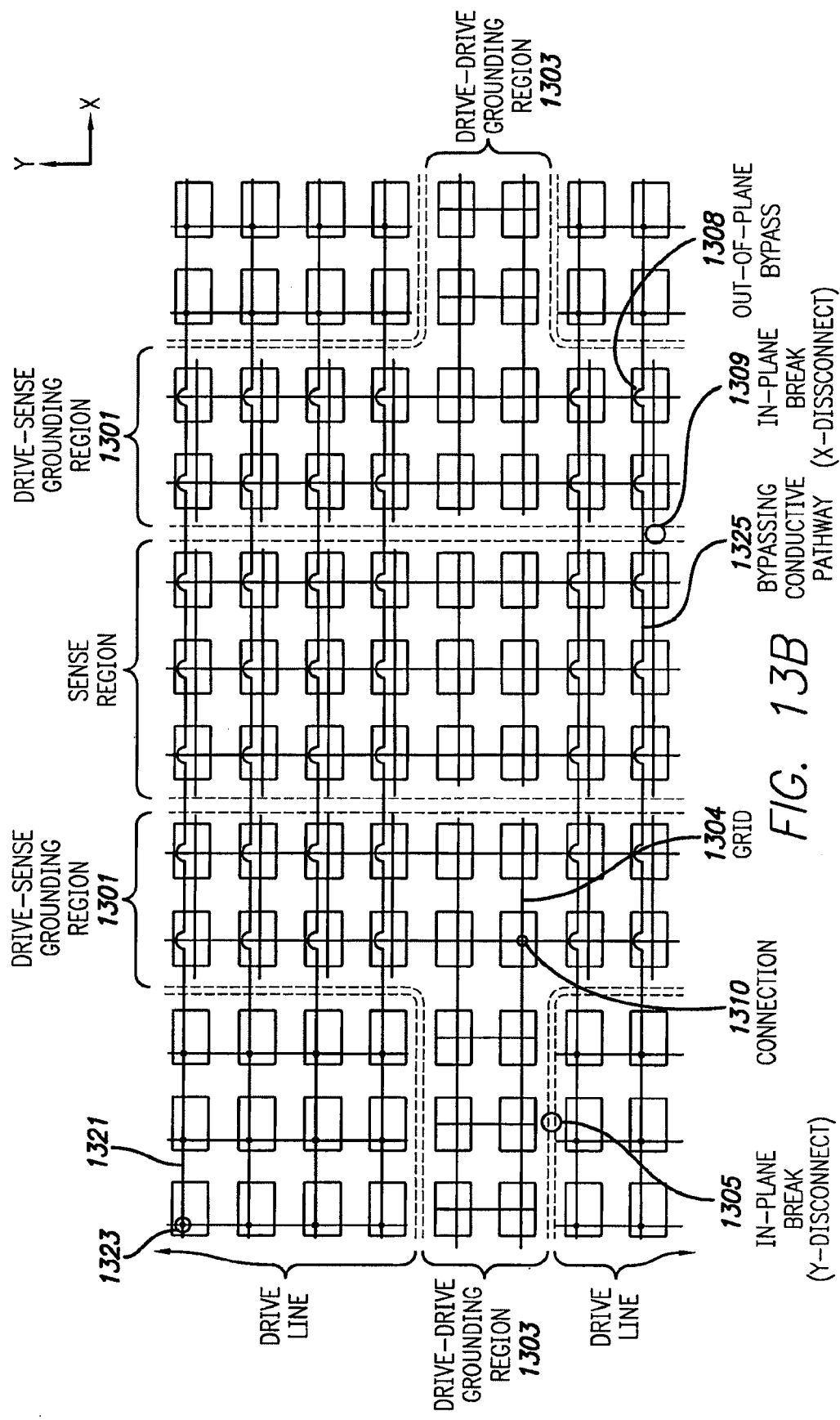

In some embodiments, display pixels can be grouped into regions between a drive region and a sense region and/or between two drive regions, for example, and these regions may be connected to ground or a virtual ground to form a grounded region in order to further minimize the interference between drive regions and/or between the drive regions and the sense regions. FIGS. 13A-B show an example layout of regions according to embodiments of the disclosure including a grounding region between drive regions and between drive regions and sense regions. In other embodiments, the vertical common voltage line breaks can be omitted and the lines shared in their entirety among the drive regions.

Figure 6:
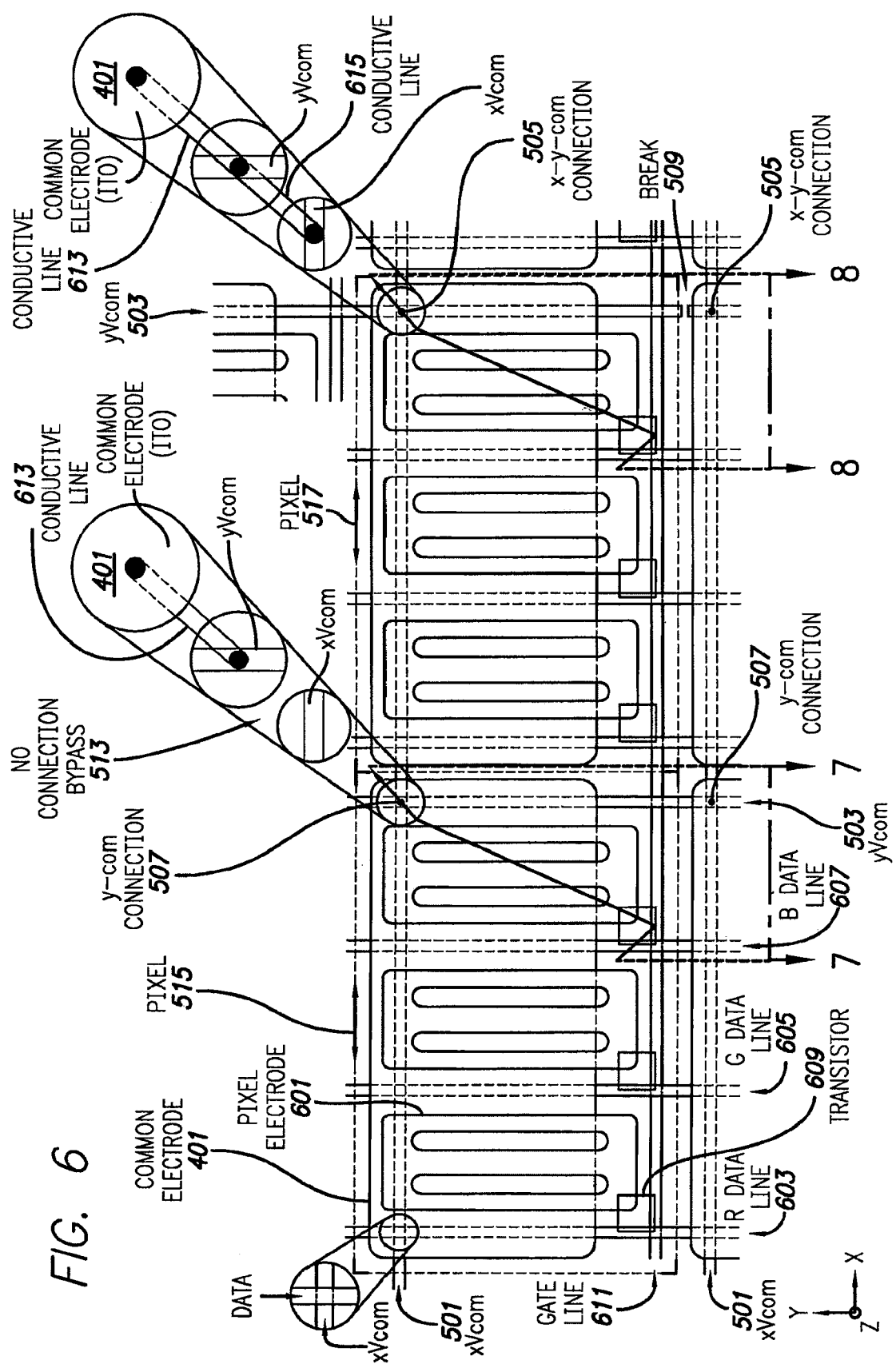
FIGS. 6-8 illustrate plan and side views showing more detail of example display pixels according to embodiments of the disclosure.
Figure 7:
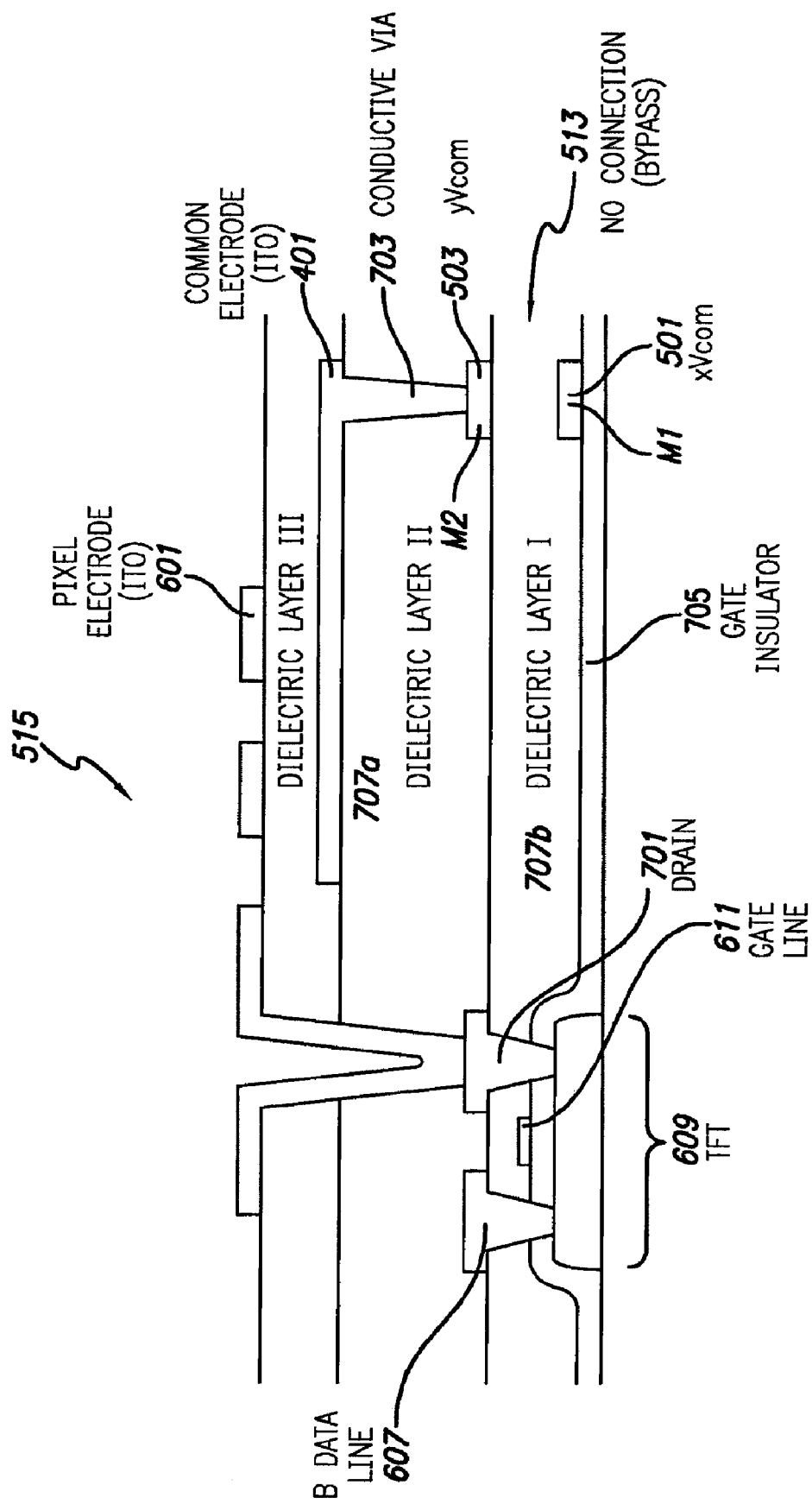
Figure 8:
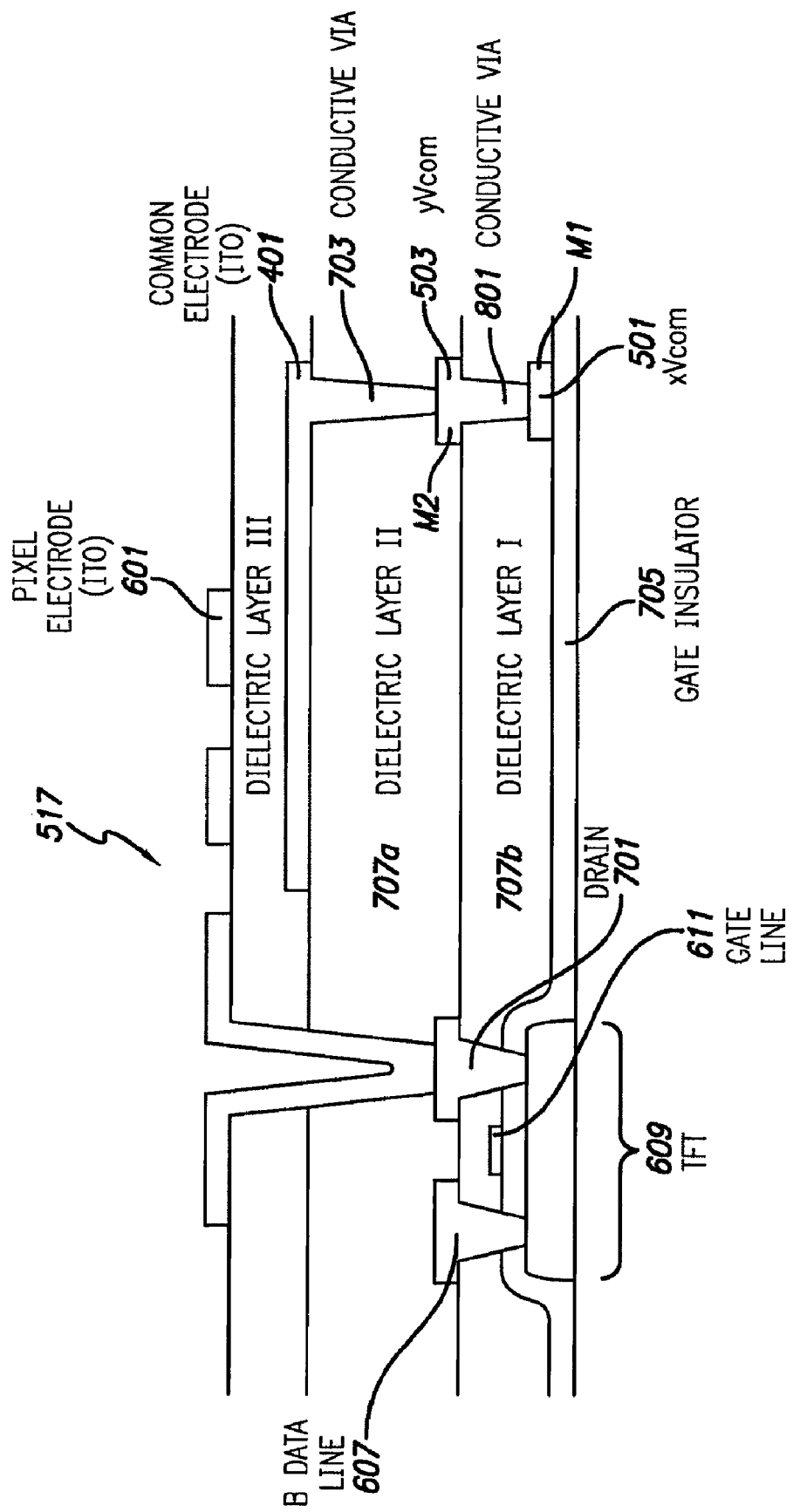

As seen in FIG. 5, display pixel 515 can be grouped into a sense region 405, and display pixel 517 can be grouped into a drive region segment 403. FIGS. 6-8 illustrate plan and side views showing more detail of display pixels 515 and 517 in "Box A" of FIG. 5, and show one example configuration including example breaks/bypasses that are in-plane/in-layer and example breaks/bypasses that are out-of-plane/out-of-layer according to embodiments of the disclosure.

FIG. 6 is a magnified view of "Box A" in FIG. 5, showing more detail of display pixels 515 and 517 and other structures of touch screen 220 according to embodiments of the present disclosure. Display pixels 515 and 517 can each include a common electrode 401 and three display pixel electrodes 601, one each for a red (R) sub-pixel, a green (G) sub-pixel, and a blue (B) sub-pixel corresponding to an R data line 603, a G data line 605, and a B data line 607 that provide color data to the sub-pixels when the sub-pixels' transistors 609 are switched on by a voltage applied across a gate line 611 during the display phase of the touch screen.

In some embodiments, other types of display pixels can be used, such as monochrome (e.g., black and white) display pixels, display pixels including more than or fewer than three sub-pixels, display pixels that operated in a non-visible spectrum, such as infrared, etc. Different embodiments can include display pixels having a different size, shape, optical properties. The display pixels of some embodiments may be of different sizes, shapes, optical properties, etc., with respect to each other, and the different types of display pixels utilized in a touch screen may provide different functionalities in some embodiments.

FIG. 6 also illustrates that yVcom line 503 running through display pixel 517 has break 509 separating display pixel 517 (and display pixel 517's drive region segment 403, see FIG. 5) from the adjacent drive region segment. Break 509 is an example of an in-plane break that is an electrical open between conductive pathways running in substantially the same plane, in this case the x-y plane in which yVcom line 503 runs. Likewise, break 509 is an example of an in-layer break that is an electrical open between conductive pathways running in the same layer, in this case the second metal layer, as described below. While many in-layer breaks may also be in-plane breaks, this is not necessarily the case. For example, a break in a conductive pathway of a material layer in a stackup could occur at a location at which the layer is formed at different stackup heights (i.e., different planes), and thus a break at such a location would be an in-layer, out-of-plane break, rather than an in-layer, in-plane break.

On the other hand, yVcom line 503 running through display pixel 515 of sense region 405 does not include a break, so that display pixel 515 may be electrically connected to other display pixels of sense region 405 in the y-direction, i.e., the display pixels in the sense region are y-connected.

An xVcom line 501 runs in the x-direction through display pixels 515 and 517. The xVcom line 501 lies behind R, G, and B data lines 603, 605, and 607, respectively, as shown in the magnified view of the xVcom behind the R data line 603 at the upper left corner of display pixel 515. Connections between the xVcom and yVcom lines and the common electrodes 401 of display pixels 515 and 517 are shown in more detail in exploded views in FIG. 6, which also show that xVcom line 501 lies behind yVcom line 503, and yVcom line 503 lies behind common electrode 401. For the sense region's display pixel 515, the exploded view of y-com connection 507 of display pixel 515 shows that the y-com connection is a conductive line 613 (e.g., a via filled with a conductive material) between yVcom line 503 and common electrode 401 of the display pixel, and shows that there is no connection, i.e., a bypass 513, between xVcom line 501 and yVcom line 503 (and therefore, no connection between the xVcom line and the common electrode). As a result of bypass 513, display pixel 515 can be x-disconnected, or isolated in the x-direction, that is, disconnected or isolated from adjacent display pixels along the x-direction. In this example embodiment, the additional connections of the sense region's yVcom lines 503, such as the border switches described above, electrically connect the common electrode 401 of display pixel 515 to the common electrode of the adjacent sense region display pixel to the left of display pixel 515, therefore bypass 513 "right-disconnects" display pixel 515 from the adjacent drive region display pixel 517 to the right of display pixel 515 (in other words, display pixel 515 can be x-disconnected from display pixels in the positive x-direction, i.e., positive x-disconnected).

Bypass 513 is an example of an out-of-plane bypass that can be an electrical open between conductive pathways running in substantially different planes; in this case the x-y plane in which yVcom line 503 runs can be different than the x-y plane in which xVcom line 501 runs. Likewise, bypass 513 is an example of an out-of-layer bypass that can be an electrical open between conductive pathways running in different layers, in this case the second metal layer of yVcom 503 and the first metal layer of xVcom 501, as described below. This configuration, including the yVcom-to-common electrode connection, yVcom-to-yVcom connections in the touch screen border (for yVcom lines of the same sense region, as described above), and bypasses between the xVcom and yVcom lines, is one example of grouping together circuit elements of a display in a sense region to form a sense line for touch sensing, and bypassing the sense line with an xVcom line that links together drive region segments that are separated from each other by the sense region to form a drive line for touch sensing.

For the drive region segment's display pixel 517, the exploded view of x-y-com connection 505 of display pixel 517 shows that the x-y-com connection can include a conductive line 615 connecting the xVcom line to the yVcom line, and one of conductive lines 613 connecting the yVcom line to the common electrode. Thus, the common electrodes of each display pixel in a drive region segment can be electrically connected together because each display pixel can be connected to the same conductive grid of vertical lines (yVcom), i.e., y-connected, and horizontal lines (xVcom), i.e., x-connected. In this example configuration, the common electrodes, vertical lines, and horizontal lines can be oriented in different substantially coplanar planes and connected together through two sets of connections, one set connecting the vertical and horizontal lines, and the other set connecting the vertical lines and the common electrodes. This configuration, including the breaks in the vertical lines, is one example of grouping together circuit elements of a display in a drive region segment to form touch sensing circuitry of a drive line that can be linked to other drive line segments through drive line links that bypass intervening sense lines.

FIGS. 7-8 are cross section views illustrating a portion of the display pixel 515 stackup and a portion of the display pixel 517 stackup, respectively. FIG. 7 shows a view of a cross section of display pixel 515 taken along the arrowed line from 7-7' of FIG. 6. FIG. 7 includes gate line 611 and xVcom line 501 formed in a first metal layer (M1), B data line 607, a drain 701, and yVcom line 503 formed in a second metal layer (M2). The figure also includes common electrode 401 and display pixel electrode 601 formed of a transparent conductor, such as ITO. Common electrode 401 can be electrically connected to yVcom line 503 through a via in a dielectric layer 707a that can be filled with a conductive material, conductive via 703, which is one example of conductive line 613 of FIG. 6. FIG. 7 also shows bypass 513 (no connection) between xVcom 501 and yVcom 503. In this regard, bypass 513 can be regarded as the structure that separates xVcom 501 and yVcom 503, which can include a portion of dielectric layer 707b. A gate insulator layer 705 may comprise a dielectric material, such as SiO2, SiNx, etc. The liquid crystal layer can be disposed above the pixel electrodes followed by color filters, and polarizers can be positioned on top and bottom of the stackup (not shown). The touch screen is viewed from the top in relation to FIG. 7.

FIG. 8 shows a view of a cross section of display pixel 517 taken along the arrowed line from 8-8' of FIG. 6. FIG. 8 is identical to FIG. 7 except that a conductive via 801 in FIG. 8 replaces bypass 513 in FIG. 7. Thus, xVcom 501 can be electrically connected to yVcom 503 in the drive region segment display pixel 517. Thus, conductive line 615 in FIG. 6 can be a conductor-filled via in this example stackup.

Taken together, FIGS. 7-8 illustrate one example of how the use of out-of-plane/out-of-layer breaks/bypasses according to embodiments of the disclosure may, in some embodiments, provide an efficient way to create a multi-function touch sensing LCD structure including multi-function circuit elements. In this case, in some embodiments connections/bypasses made between the conductive pathways in different planes/layers can allow for more options in the design of a multi-function configuration, and could potentially reduce the number of added structures, e.g., lines, that would otherwise need to be added to form bypasses in the same plane/layer. In this regard, y-disconnections and/or x-disconnections in some embodiments may be conveniently formed by simply forming conductive pathways in different planes/layers of a display pixel stackup, for example. Likewise, y-connections and/or x-connections in some embodiments may be conveniently formed using conductive pathways between different planes/layers to connect conductive pathways in the different planes/layers. In particular, this may allow existing LCD design to be more easily modified to add integrated touch functionality according to embodiments of the disclosure. In this regard, selective use of in-plane/in-layer and out-of-plane/out-of-layer breaks and bypasses may allow more of the structures in existing LCD designs to be used as circuit elements in the touch sensing system, and may reduce the number of changes needed to existing manufacturing processes, such as masking, doping, depositing, etc.

Figure 9:
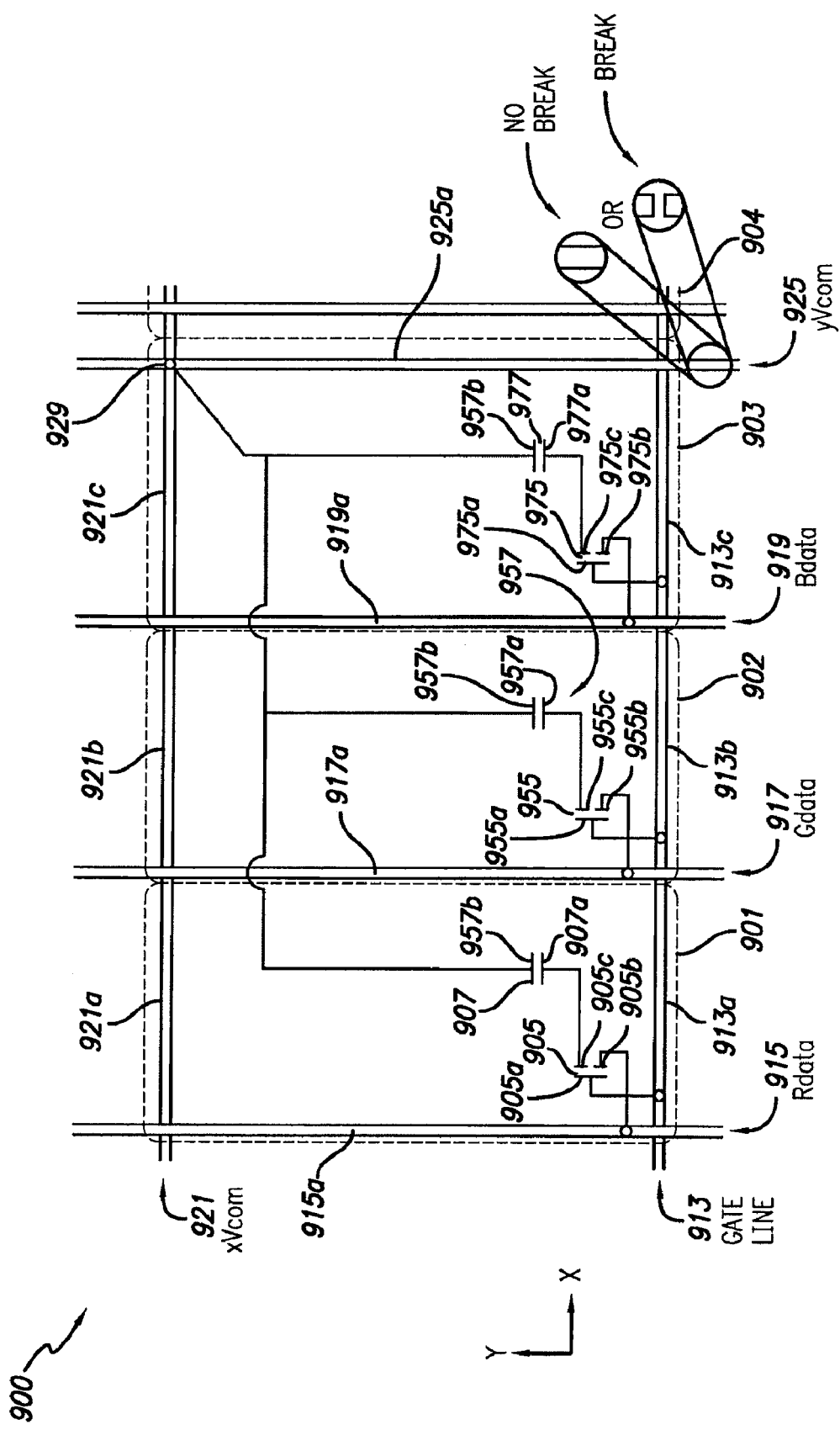
FIG. 9 is a partial circuit diagram of an example touch screen including a plurality of sub-pixels according to embodiments of the disclosure.

Further details of an example touch screen and an example method of operating multi-function touch screen LCD circuit elements will be described in reference to FIGS. 9-12B. FIG. 9 is a partial circuit diagram of an example touch screen 900, including a plurality of sub-pixels according to embodiments of the disclosure. As in example embodiments described above, the sub-pixels of touch screen 900 can be configured such that they are capable of multi-functionality as both LCD sub-pixels and touch sensor circuit elements. That is, the sub-pixels can include circuit elements that can operate as part of the LCD circuitry of the display pixels and that can also operate as circuit elements of touch sensing circuitry. In this way, touch screen 900 can operate as an LCD with integrated touch sensing capability. FIG. 9 shows details of sub-pixels 901, 902, and 903 of touch screen 900. In this example embodiment, each sub-pixels can be a red (R), green (G) or blue (B) sub-pixel, with the combination of all three R, G and B sub-pixels forming one color display pixel. Although this example embodiment includes red, green, and blue sub-pixels, a sub-pixel may be based on other colors of light or other wavelengths of electromagnetic radiation (e.g., infrared) or may be based on a monochromatic configuration.

Sub-pixel 902 can include a thin film transistor (TFT) 955 with a gate 955a, a source 955b, and a drain 955c. Sub-pixel 902 can also include a common electrode (Vcom) 957b that can be, for example, a continuous plate of substantially conductive material shared among sub-pixels 901, 902, and 903, such as common electrode 401 shown in FIG. 6. Sub-pixel 902 can also include a pixel electrode 957a that can operate with common electrode 957b as part of the display system circuitry. Pixel electrode 957a can, for example, be the pixel electrode 601 shown in FIGS. 6-8. Touch screen 900 can operate as an FFS display system in which the pixel electrode of each sub-pixel and the common electrode generate the fringe field applied to the liquid crystal of the sub-pixel, and can also form a storage capacitor of the sub-pixel. Sub-pixel 902 can include a storage capacitor 957 formed by pixel electrode 957a and common electrode 957b. Sub-pixel 902 can also include a portion 917a of a data line for green (G) color data, Gdata line 917, and a portion 913b of a gate line 913. Gate 955a can be connected to gate line portion 913b, and source 955b is connected to Gdata line portion 917a. Pixel electrode 957a can be connected to drain 955c of TFT 955.

Sub-pixel 901 can include a thin film transistor (TFT) 905 with a gate 905a, a source 905b, and a drain 905c. Sub-pixel 901 can also include a pixel electrode 907a that can operate with common electrode 957b to generate the fringe field for the sub-pixel and to form a storage capacitor 907. Sub-pixel 901 can also include a portion 915a of a data line for red (R) color data, Rdata line 915, and a portion 913a of gate line 913. Gate 905a can be connected to gate line portion 913a, and source 905b can be connected to Rdata line portion 915a. Pixel electrode 907a can be connected to drain 905c of TFT 905. Sub-pixels 901 and 902 can include, for example, most or all of the structure of conventional LCD sub-pixels.

Sub-pixel 903 can include a thin film transistor (TFT) 975 with a gate 975a, a source 975b, and a drain 975c. Sub-pixel 903 can also include a pixel electrode 977a that can operate with common electrode 957b to generate the fringe field for the sub-pixel and to form a storage capacitor 977. Sub-pixel 903 can also include a portion 919a of a data line for blue (B) color data, Bdata line 919, and a portion 913c of gate line 913. Gate 975a can be connected to gate line portion 913c, and source 975b can be connected to Bdata line portion 919a. Pixel electrode 977a can be connected to drain 975c of TFT 975. Unlike sub-pixels 901 and 902, sub-pixel 903 can also include a portion 925a of a common voltage line running in the y-direction, yVcom 925, and a connection point 929. In other embodiments, the yVcom could run through the red sub-pixels or the green sub-pixels, instead of the blue sub-pixels. A connection, such as y-com connection 507 or x-y-com connection 505 described above in reference to FIG. 6, can be made at connection point 929 in order, for example, to connect common electrode 957b to yVcom 925 (which runs vertically through other display pixels), to connect common electrode 957b to yVcom 925 and xVcom 921 (which runs horizontally through other pixels), etc. In this way, for example, common electrode 957b can be connected with common electrodes of other display pixels to create regions of connected common electrodes.

One way to create separate regions is by forming breaks (opens) in the horizontal and/or vertical common lines, as described above in some example embodiments. For example, yVcom 925 can have an optional break as shown in FIG. 9, which can allow sub-pixels above the break to be isolated from sub-pixels below the break, i.e., the sub-pixels can be bottom-disconnected. An x-disconnection can be created by forming a y-com connection instead of an x-y-com connection at connection point 929, thus, disconnecting xVcom 921 from common electrode 957b. In some embodiments, xVcom 921 may include breaks, which can allow sub-pixels to the right of the break to be isolated from sub-pixels to the left of the break. Other configurations can allow display pixel circuit elements to be grouped as described above with drive line segments linked together through bypasses of sense lines.

In this way, common electrodes of touch screen 900 can be grouped together to form a structure within the display pixels that can operate as part of the touch sensing circuitry of a touch sensing system. For example, the common electrodes can be configured to form drive regions or sense regions, to form bypasses and links as described above for some embodiments, etc. In this regard, circuit elements such as the common electrodes, the xVcom lines, etc. can operate as multi-function circuit elements.

In general, touch screen 900 could be configured such that the common electrodes of all sub-pixels in the screen can be connected together, for example, through at least one vertical common voltage line with connections to a plurality of horizontal common voltage lines. Another touch screen could be configured such that different groups of sub-pixels can be connected together to form a plurality of separate regions of connected-together common electrodes.

Figure 10:
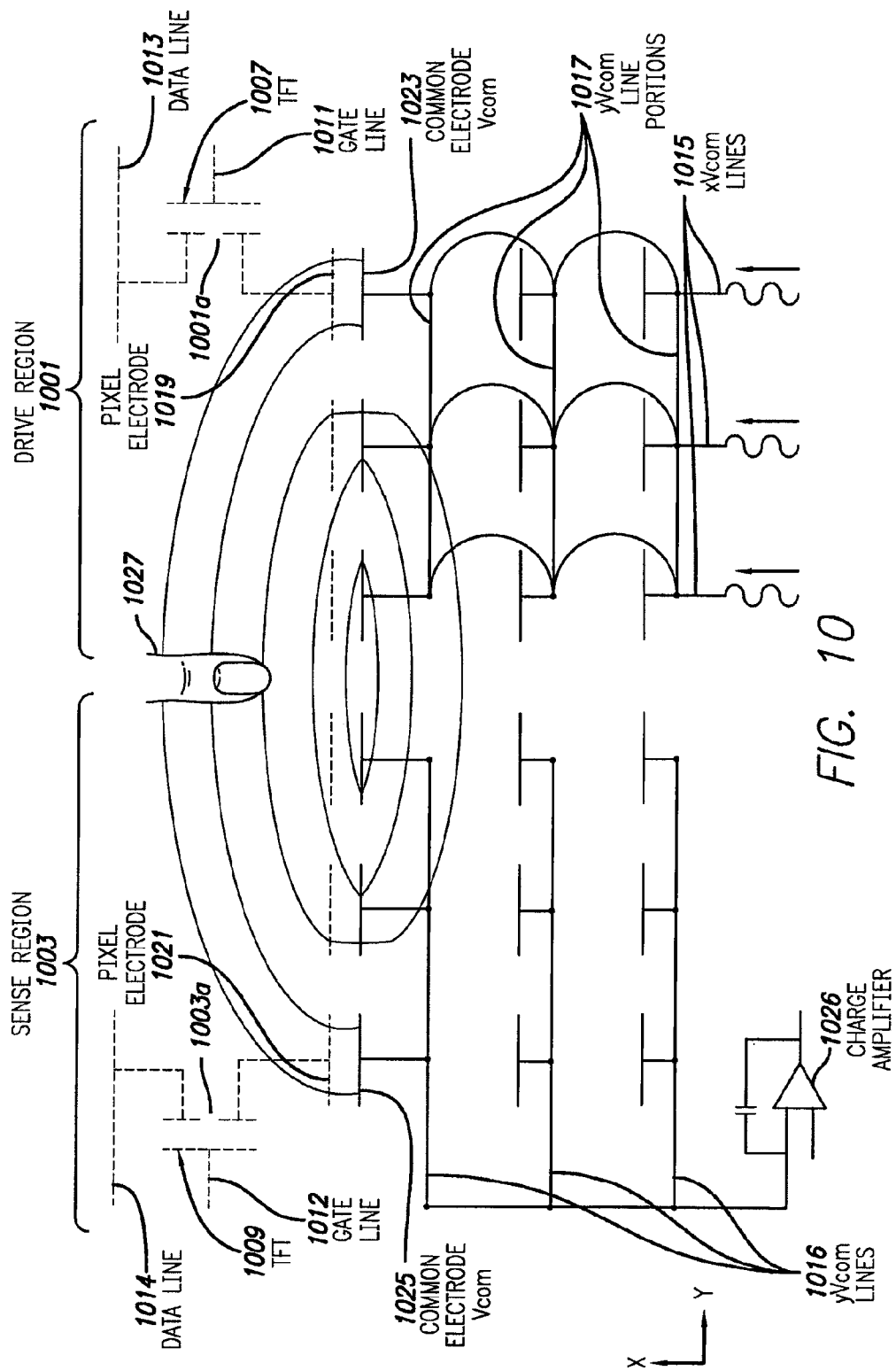
FIGS. 10-12B illustrate an example touch sensing operation according to embodiments of the disclosure.

A touch sensing operation according to embodiments of the disclosure will be described with reference to FIGS. 10-12B. FIG. 10 shows partial circuit diagrams of some of the touch sensing circuitry within display pixels in a drive region 1001 and a sense region 1003 of an example touch screen according to embodiments of the disclosure. For the sake of clarity, FIG. 10 includes circuit elements illustrated with dashed lines to signify some circuit elements operate primarily as part of the display circuitry and not the touch sensing circuitry. In addition, a touch sensing operation is described primarily in terms of a single drive display pixel 1001a (e.g., a single display pixel of drive region 1001) and a single sense display pixel 1003a (e.g., a single display pixel of sense region 1003). However, it is understood that other drive display pixels in drive region 1001 can include the same touch sensing circuitry as described below for drive display pixel 1001a, and the other sense display pixels in sense region 1003 can include the same touch sensing circuitry as described below for sense display pixel 1003a. Thus, the description of the operation of drive display pixel 1001a and sense display pixel 1003a can be considered as a description of the operation of drive region 1001 and sense region 1003, respectively.

Referring to FIG. 10, drive region 1001 includes a plurality of drive display pixels including drive display pixel 1001a. Drive display pixel 1001a includes a TFT 1007, a gate line 1011, a data line 1013, an xVcom line portion 1015 and a yVcom line portion 1017, a pixel electrode 1019, and a common electrode 1023. FIG. 10 shows common electrode 1023 connected to the common electrodes in other drive display pixels in drive region 1001 through xVcom line portions 1015 and yVcom line portions 1017 to form a structure within the display pixels of drive region 1001 that is used for touch sensing as described in more detail below. Sense region 1003 includes a plurality of sense display pixels including sense display pixel 1003a. Sense display pixel 1003a includes a TFT 1009, a gate line 1012, a data line 1014, a yVcom line portion 1016, a pixel electrode 1021, and a common electrode 1025. FIG. 10 shows common electrode 1025 connected to the common electrodes in other sense display pixels in sense region 1003 through yVcom line portions 1016 that can be connected, for example, in a border region of the touch screen to form a structure within the display pixels of sense region 1003 that is used for touch sensing as described in more detail below.

During a touch sensing phase, drive signals applied to xVcom line portions 1015 generate an electrical field between the structure of connected common electrodes 1023 of drive region 1001 and the structure of connected common electrodes of 1025 of sense region 1003, which is connected to a sense amplifier, such as a charge amplifier 1026. Electrical charge is injected into the structure of connected common electrodes of sense region 1003, and charge amplifier 1026 converts the injections of charge into a voltage that can be measured. The amount of charge injected, and consequently the measured voltage, can depend on the proximity of a touch object, such as a finger 1027, to the drive and sense regions. In this way, the measured voltage can provide an indication of touch on or near the touch screen.

Figure 11A:
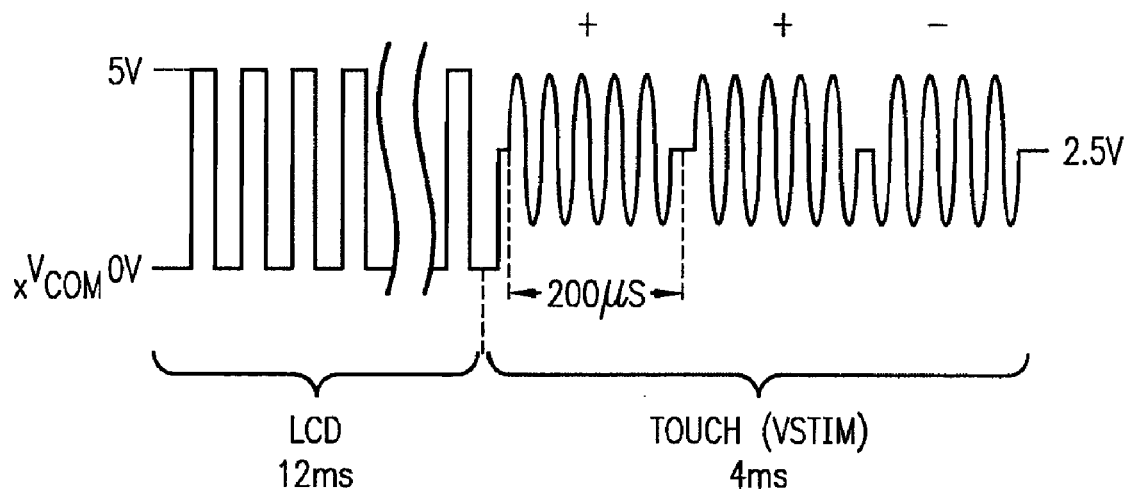

FIG. 11A shows example signals applied through xVcom 1015 to the drive display pixels of drive region 1001, including drive display pixel 1001*a*, during an example LCD or display phase and during an example touch phase. During the LCD phase, xVcom 1015 and yVcom 1017 can be driven with a square wave signal of 2.5V+/−2.5V, in order to perform LCD inversion. The LCD phase is 12 ms in duration.

Figure 11B:
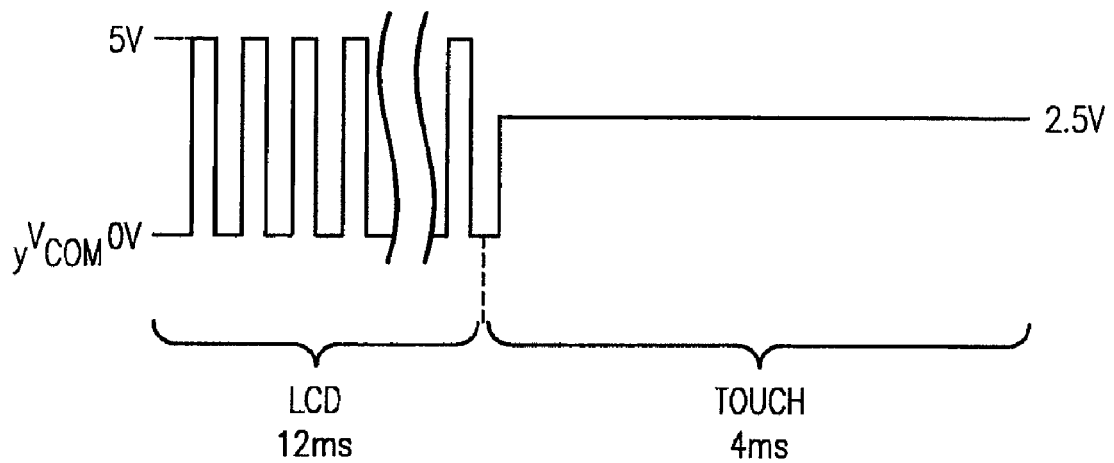

In the touch phase, xVcom 1015 can be driven with an AC signal, such as a sinusoidal wave, a square wave, a triangular wave, etc. In the example shown in FIG. 11A, xVcom can be driven with 15 to 20 consecutive stimulation phases lasting 200 microseconds each while yVcom 1016 is maintained at the virtual ground of charge amplifier 1026 as shown in FIG. 11B. The drive signals in this case can be square or sinusoidal signals of 2.5V+/−2V each having the same frequency and a relative phase of either 0 degrees or 180 degrees (corresponding to "+" and "−" in FIG. 11A). The touch phase is 4 ms in duration.

Figure 12A:
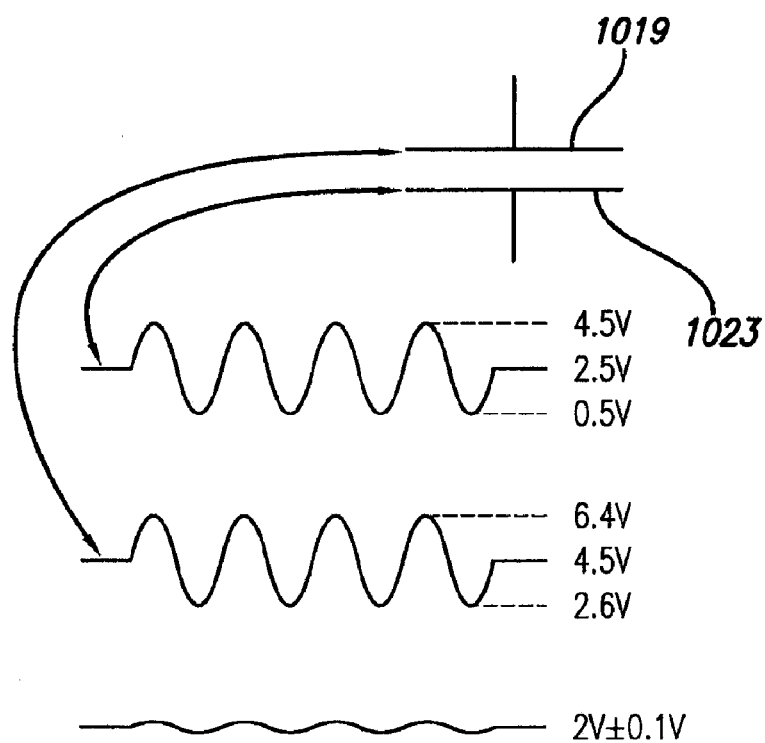

FIG. 12A shows details of the operation of common electrode 1023 during the touch phase. In particular, because the capacitance of the storage capacitor formed by common electrode 1023 and pixel electrode 1019 is much higher than other capacitances in the system (i.e., stray capacitances between various conductive structures and between the common electrode and finger 1027), almost all (approximately 90%) of the AC component of the 2.5V+/−2V sinusoidal drive signal that is applied to common electrode 1023 is also applied to pixel electrode 1019. Thus, the voltage difference between common electrode 1023 and pixel electrode 1019 can be kept small, and the liquid crystal will experience minimal electric field changes due to the touch stimuli and maintain its charge state as it was set during the LCD phase. The common electrodes 1023 and 1025 can be charged typically to 0 or 5 volts DC (square wave 2.5+/−2.0V) during display phase operation of the LCD. However, during touch mode, the common electrode in the drive region 1023 can be charged to a DC voltage of 2.5 V with superimposed sinusoidal signal of 2 V amplitude. Similarly, the common electrode in the sense region 1025 can be kept at the virtual ground of charge amplifier 1026 at DC level of 2.5 volts. During the touch phase, the sinusoidal signals on common the electrode 1023 in the drive region 1001 can be passed to common electrodes 1025 of sense region 1003. Due to high coupling between the common pixel electrodes in both drive and sense regions, 90% of the voltage changes on the common electrode is transferred to corresponding pixel electrodes, hence minimizing the disturbance of image charge stored during the display phase while performing touch sensing. In this manner, the common electrodes of the drive and sense regions can operate as circuit elements of the touch sensing circuitry by forming a structure for capacitance touch sensing without effecting the LCD image.

Figure 12B:
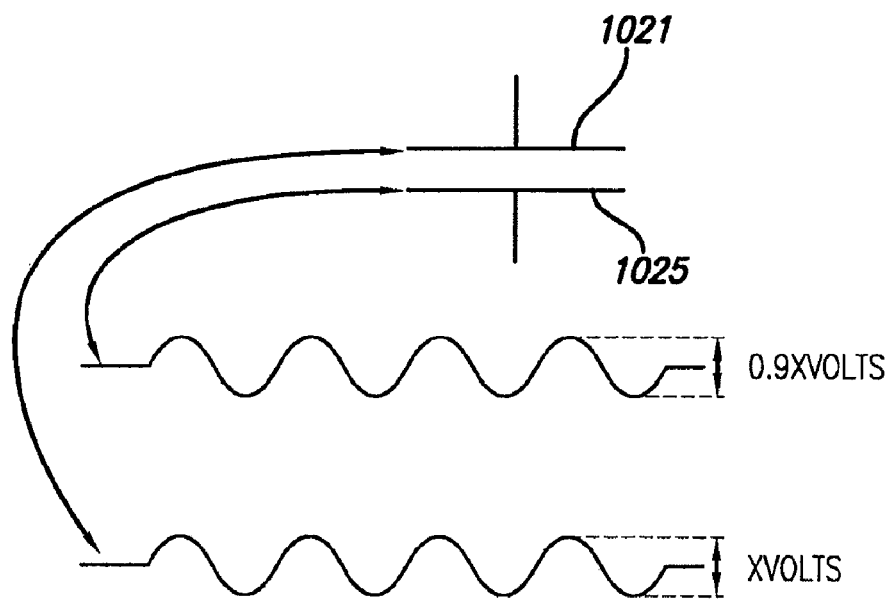

At the same time the common electrodes and pixel electrodes are configured to operate as circuit elements of the touch sensing circuitry, the electrodes may continue to operate as a part of the LCD system. As shown in FIGS. 12A-B, while the voltages of the structures of pixel electrode 1021 are each modulated at approximately +/−2V, the relative voltage between pixel electrode 1021 and common electrode 1025 remains approximately at a constant value +/−0.1V. This relative voltage is the voltage that is seen by the liquid crystal of the display pixel for the LCD operation, and its magnitude can determine the gray scale level of the image (for example in FIG. 12A, this relative voltage is 2V). The 0.1V AC variance in the relative voltage during the touch (sense) phase should have an acceptably low affect on the LCD, particularly since the AC variance would typically have a frequency that is higher than the response time for the liquid crystal. For example, the stimulation signal frequency, and hence the frequency of the AC variance, would typically be more than 100 kHz. However, the response time for liquid crystal is typically less than 100 Hz. Therefore, the common and pixel electrodes' function as circuit elements in the touch system should not interfere with the LCD function.

Referring now to FIGS. 10, 11B, and 12B, an example operation of sense region 1003 will now be described. FIG. 11B shows signals applied through yVcom 1016 to the display pixels of the sense region, including display pixel 1003*a*, during the LCD and touch phases described above. As with the drive region, yVcom 1016 is driven with a square wave signal of 2.5V+/−2.5V in order to perform LCD inversion during the LCD phase. During the touch phase, yVcom 1016 is connected to charge amplifier 1026, which holds the voltage at or near a virtual ground of 2.5V. Consequently, pixel electrode 1021 is also held at 2.5V. As shown in FIG. 10, fringe electrical fields propagate from common electrode 1023 to common electrode 1025. As described above, the fringe electrical fields are modulated at approximately +/−2V by the drive region. When these fields are received by pixel electrode 1021, most of the signal gets transferred to common electrode 1025, because display pixel 1003*a* has the same or similar stray capacitances and storage capacitance as display pixel 1001*a*.

Because yVcom 1016 is connected to charge amplifier 1026, and is being held at virtual ground, charge injected into yVcom 1016 will produce an output voltage of the charge amplifier. This output voltage provides the touch sense information for the touch sensing system. For example, when finger 1027 gets close to the fringe fields, it causes a disturbance in the fields. This disturbance can be detected by the touch system as a disturbance in the output voltage of charge amplifier 1026. Approximately 90% of a fringe field impinging onto pixel electrode 1021 that is connected to the drain of the TFT 1009 will be transferred to charge amplifier 1026. 100% of the charge impinging onto common electrode 1025 that is connected directly to yVcom 1016 will be transferred to charge amplifier 1026. The ratio of charge impinging onto each electrode will depend on the LCD design. For non-IPS, nearly 100% of the finger affected charge may impinge on the common electrode because the patterned CF plate is nearest the finger. For an IPS-type display the ratio may be closer to 50% because each part of the electrode has approximately equal area (or ¼ vs. ¾) facing the finger. For some sub-types of IPS displays, the pixel electrodes are not coplanar, and the majority of the upward facing area is devoted to the common electrode.

FIG. 13A shows another example configuration of multifunction display pixels grouped into regions that function in the touch sensing system during a touch phase of a touch screen according to embodiments of the disclosure. FIG. 13B shows a more detailed view of the touch screen with grounding regions of FIG. 13A. As shown in FIGS. 13A-B, a region of display pixels can be formed between drive regions and sense regions, for example, and the region can be grounded to true ground to form a drive-sense grounding region 1301. FIGS. 13A-B also show a similar grouping of display pixels between two drive regions, which can be likewise grounded to form a drive-drive grounding region 1303. Grounding regions, and other regions, can be formed from, for example, a connection structure, such as grid of conductive line portions. For example, FIGS. 13A-B show a grounding region connection grid 1304 of horizontal and vertical conductive pathways that include in-plane/layer breaks (y-disconnections) 1305 and in-plane/layer breaks (x-disconnections)

1309. Lines linking the drive regions can bypass the grounding regions and the sense regions with out-of-plane/layer bypasses 1308. In the example configuration of FIGS. 13A-B, drive-sense grounding region 1301 is electrically connected to drive-drive grounding regions 1303 through connections 1310, and all of the grounding regions can be grounded to a single ground 1313 through a multiplexer 1311 at one border of the touch screen.

FIG. 13B shows grounding region connection grid 1304 can connect common electrodes of grounding regions 1301 and 1303 through connections 1310, while maintaining electrical separation from other regions with in-plane breaks 1305 (y-disconnections) and in-plane breaks 1309 (x-disconnections). The common electrodes of the sense region can be similarly connected with a grid. FIG. 13B also shows the common electrodes of drive regions can be formed of a different grid of conductive lines connected by connections 1323 to form a drive region connection grid 1321. Horizontal lines of drive region connection grid can bypass the grounding regions and the sense regions with a bypassing conductive pathway 1325 running through the grounding and sense regions using out-of-plane bypasses 1308, for example, to prevent electrical contact between the drive region and the grounding and sense regions. Bypassing conductive pathway can be, for example, a drive tunnel described in more detail below. In the example configuration of FIGS. 13A-B, grounding regions 1301 and 1303 are each two display pixels wide; however, the width of a grounding region is not limited to two display pixels, but can be fewer or more display pixels in width. Likewise, although FIGS. 13A-B show drive-drive grounding regions connected to drive-sense grounding regions, in other embodiments grounding regions can be electrically separated from other grounding regions. In other embodiments, grounding regions can be grounded to other types of ground, such as an AC ground. Grounding regions 1301 and 1303 can help to reduce a static capacitance that can form between drive and sense regions and/or drive and drive regions. Reducing such static capacitances in the touch system configuration can improve the accuracy and power consumption of the touch screen, for example.

FIGS. 14A-16C illustrate another example configuration of multi-function circuit elements of display pixels according to embodiments of the disclosure including a third metal (M3) layer, and illustrate example methods for manufacturing the display pixels according to embodiments of the disclosure. FIGS. 14A-16C show an example set of three different display pixels in a side-by-side view simply for ease of comparison, and is not intended to imply a particular ordering of display pixels. FIGS. 14A-14C show an example display pixel 1401 in a drive region, such as display pixel 517 described above in reference to FIGS. 5-6. FIGS. 15A-15C show an example display pixel 1501 in the sense region with a drive tunnel, such as pixel 515 described in reference to FIGS. 5-6. FIGS. 16A-16C show an example display pixel 1601 in the sense region without a drive tunnel. In the following description, processes and structures common to all of display pixels 1401, 1501, and 1601 are described with respect to a single display pixel, simply for the purpose of clarity.

FIGS. 14A, 15A, and 16A show earlier stages of processing including a first stage of forming a poly-silicon layer, including circuit elements of the transistors. A second stage includes forming gate lines in an M1 layer of all display pixels, and forming an xVcom line in the M1 layer of display pixels 1401 and 1501. The xVcom line of display pixel 1401 includes an expanded portion at the left side to allow for connection to a yVcom line. The xVcom line of display pixel 1501 acts as a drive tunnel that bypasses the other conductive pathways in the sense region because no connection is made between the xVcom line and the other conductive pathways of the sense region (i.e., there is a bypass). Next, a connection layer (CON1) is formed including connections on transistor circuit elements of the display pixels. Display pixel 1401 includes an additional connection on the expanded xVcom portion. Data lines are formed in the M2 layer of the display pixels, and the M2 layer of display pixel 1401 includes a yVcom line.

FIGS. 14B, 15B, and 16B show middle stages of processing. For reference, the M2 layer is also shown. A second connection layer (CON2) is formed to connect the transistor drains to a pixel electrode. Display pixel 1401 includes another connection in CON2 that connects yVcom to the common electrode. Next, the common electrode is formed, for example, of ITO.

FIGS. 14C, 15C, and 16C show later stages of the processing, and show the Vcom from prior processing for reference. A third metal (M3) layer is formed. The M3 layer of display pixel 1401 is different than the M3 layer of display pixels 1501 and 1601, as shown. The M3 layer configurations of the sense region display pixels, 1501 and 1601, includes vertical lines that connect to display pixels above and below, thus allowing the sense region display pixels to be connected in the y-direction without the use of a yVcom line. Mimicking this M3 structure in the drive region display pixels 1401 can help reduce visual incongruities of the touch screen that may result from the additional metal in the sense region. A third connection layer (CON3) is formed and then display pixel electrodes are formed on all display pixels.

Taken together, FIGS. 14A-C show a display pixel 1401 configured for a drive region similar to display pixel 517 described above. Display pixel 1401 includes a gate line 1403 and an xVcom line 1405 in a first metal (M1) layer, and a yVcom line 1407 and data lines 1409 in a second metal (M2) layer. Display pixel 1401 can include a connection such as an x-y-com connection 1411, such as connection 505 described above. The x-y-com connection 1411 connects xVcom line 1405, yVcom line 1407, with a common electrode (Vcom) 1413.

Taken together, FIGS. 15A-C shows a touch screen display pixel 1501 configured for a sense region similar to display pixel 515 described above. Display pixel 1501 includes a gate line 1503 and an xVcom line 1505 in an M1 layer, and data lines 1507 in an M2 layer. Because xVcom line 1505 is formed in a lower layer of the stackup (M1), and because no connection is provided between xVcom and yVcom, the xVcom lines "tunnel" horizontally through the sense region display pixel 1501 without connecting to the common electrodes (Vcom) 1513 of the sense region. This is one example of a drive tunnel, which can connect drive regions through a conductive pathway running through the display pixel stackup of another type of region, such as a sense region, while bypassing that region, i.e., does not electrically contact with the touch sense circuit elements in the display pixel stackup of the bypassed region. Likewise, in other embodiments, other types of tunnels could be used, such as sense tunnels connecting sense regions. FIG. 15C shows a third metal (M3) layer is used, in part, as a connection structure to electrically connect display pixel circuit elements in the sense region, in both the x and y directions, as shown by the connection grid 1509. Note that while yVcom is used in drive pixel electrodes 1401, no yVcom is used in the sense pixel electrodes 1501 and 1601. Rather, y connectivity is provided by the M3 layer. In some embodiments, the display pixels in the sense region can be connected together in the horizontal direction through connections and switches in the border of the touch screen.

Taken together, FIGS. 16A-C show a display pixel 1601 that is identical to display pixel 1501, except that display pixel 1601 does not include a drive tunnel. Display pixel 1601 does include a connection structure in the M3 layer to electrically connect display pixel circuit elements in the sense region, as shown by the connection grid 1603 in FIG. 16C.

Figure 20:
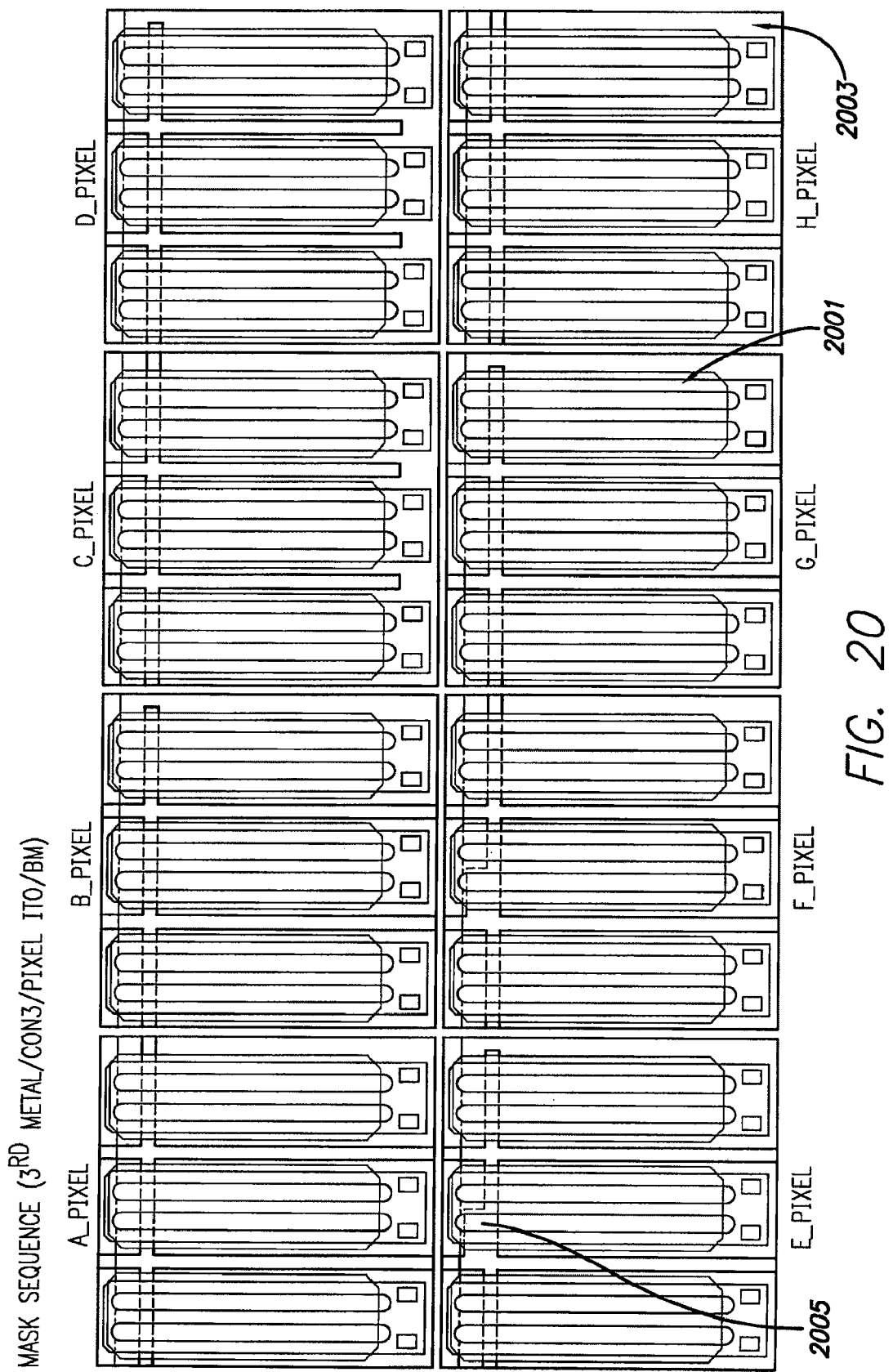
Figure 21A:
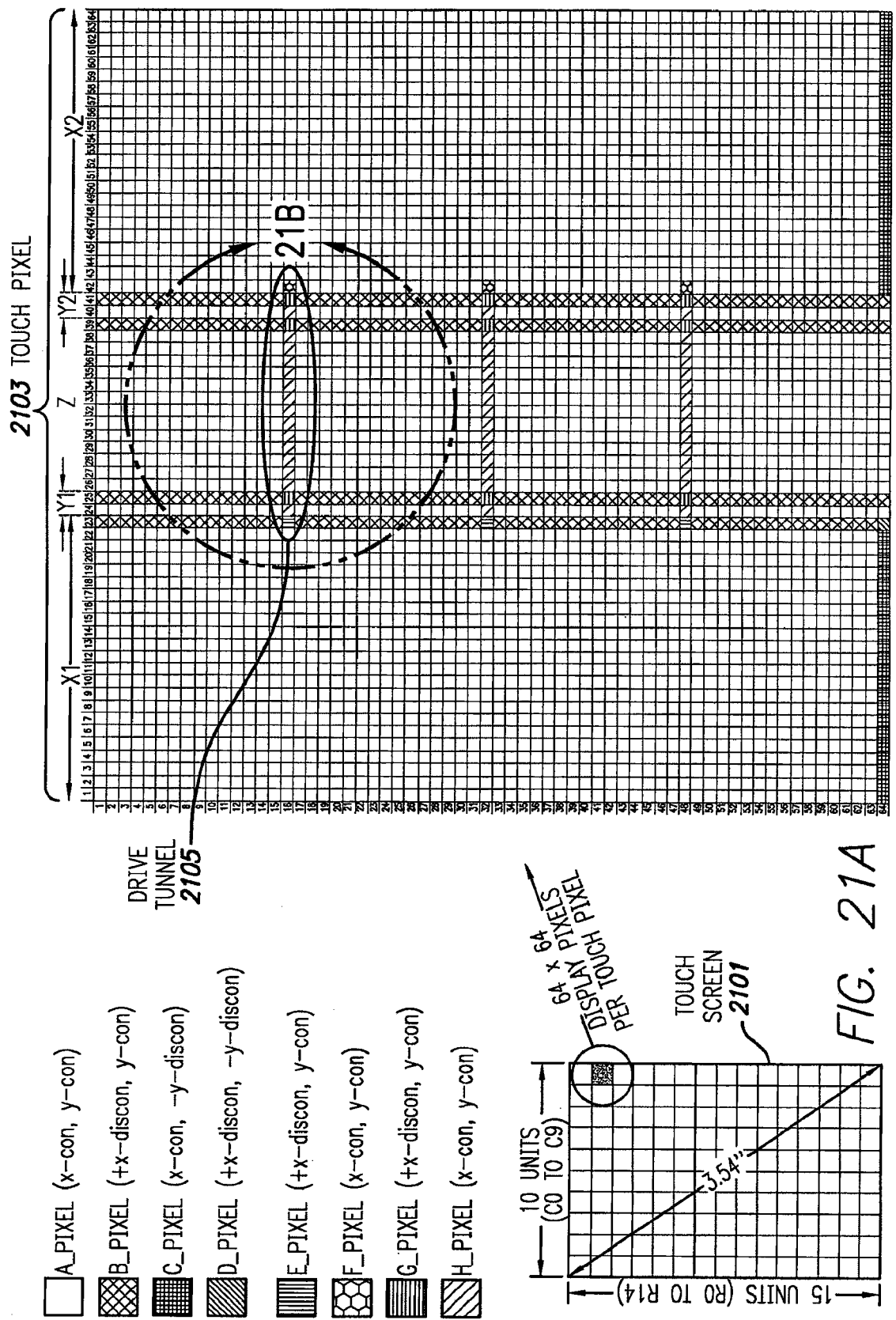
FIG. 21A illustrates an example layout of display pixels for one example touch pixel according to embodiments of the disclosure.
Figure 21B:
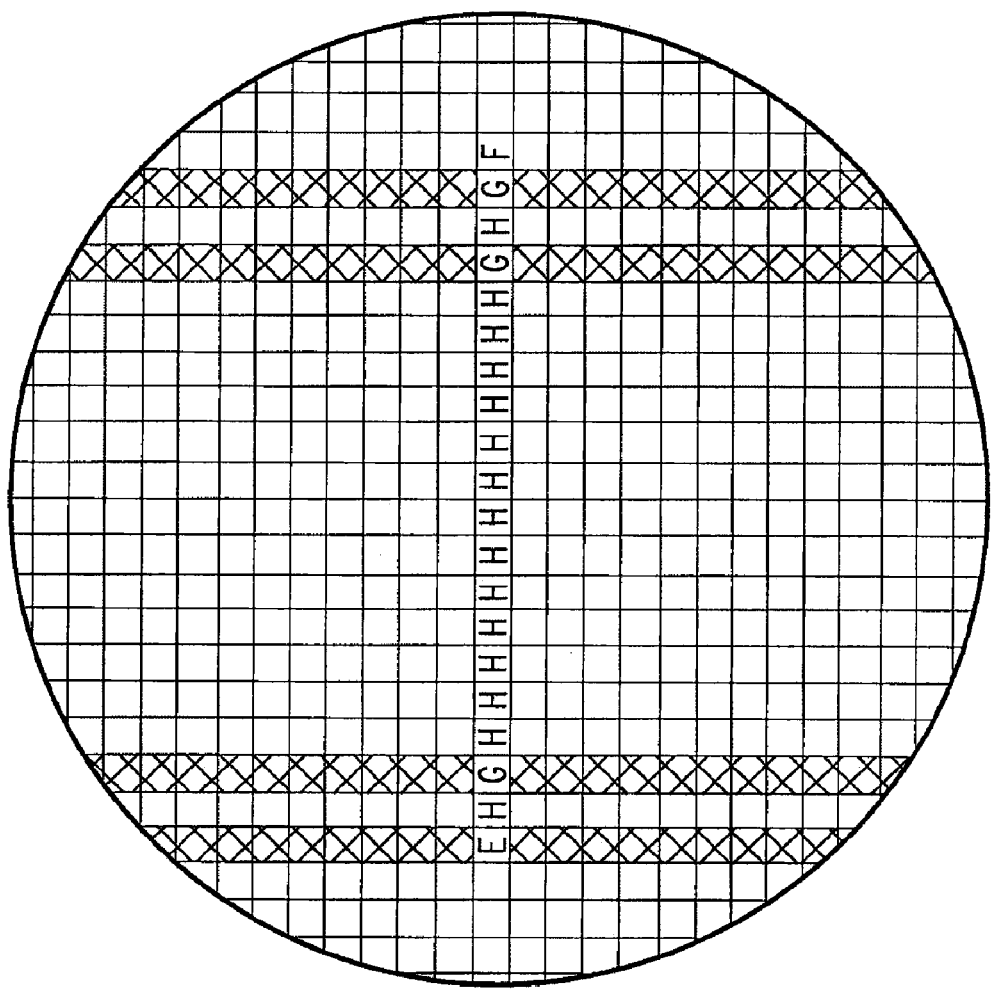
FIG. 21B is a magnified view of a portion of FIG. 21A illustrating an example drive tunnel according to embodiments of the disclosure.
Figures 1, 22:
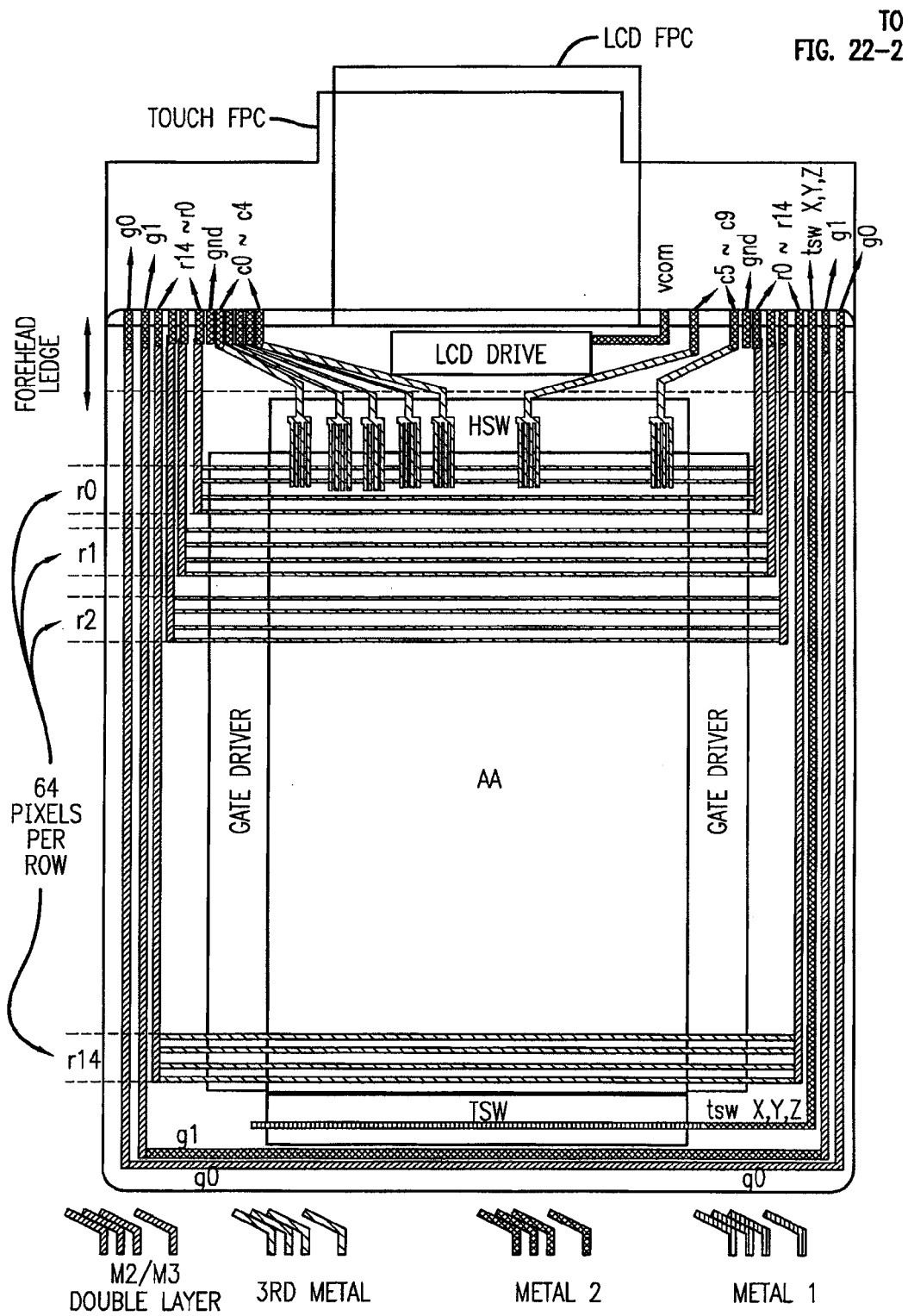
Figures 2, 22:
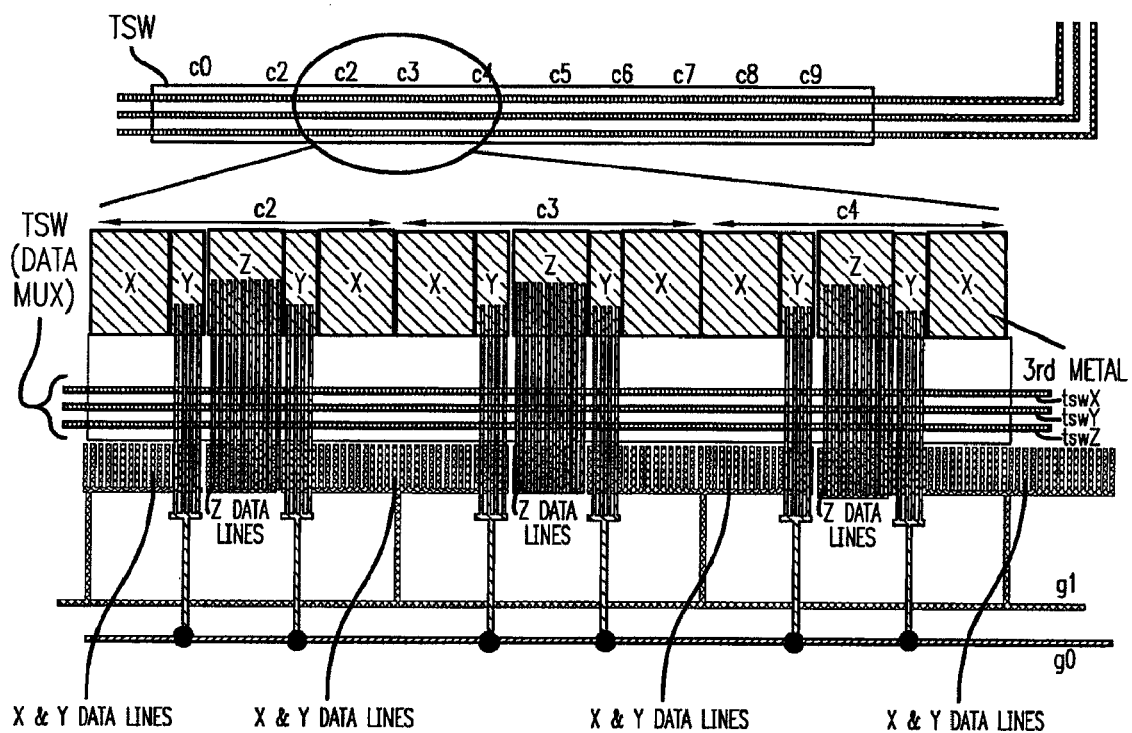

FIGS. 17-23 illustrate other example configurations of display pixels including another configuration of a third metal (M3) layer, example methods for manufacturing the display pixels, an example touch pixel layout, and an example touch screen according to embodiments of the disclosure. As with FIGS. 14A-16C above, FIGS. 17-20 illustrate a side-by-side view of an example set of display pixels in different stages of manufacture simply for ease of comparison. FIGS. 21A and 21B illustrate an example layout of display pixels for one example touch pixel according to embodiments of the disclosure. FIGS. 22-1 and 22-2 illustrate an example touch pixel layout that can include example touch pixels such as those shown in FIG. 21A.

Referring to FIGS. 17-20, an example manufacturing processes for display pixel stackups of a set of eight example display pixels (labeled A_pixel, B_pixel, H_pixel). As explained in more detail below, each of the display pixels in the set is one of three types of display pixels, a connection layer type, a contact type, and a tunnel type, as described in more detail below. In the following description, processes and structures common to all of display pixels A-H may be described with respect to a single display pixel, simply for the purpose of clarity.

Figure 17:
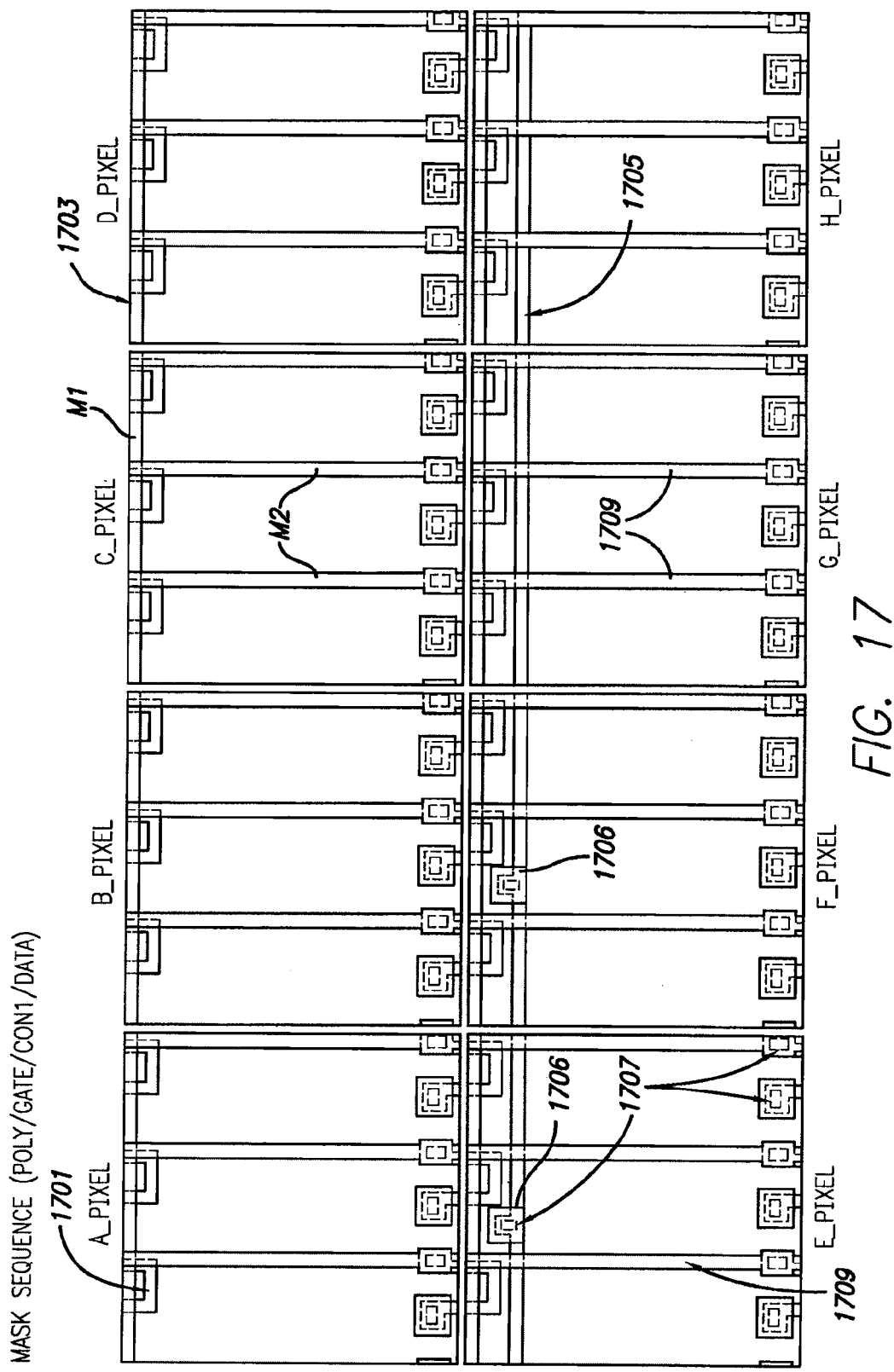
FIGS. 17-20 illustrate example display pixels in different stages of manufacture according to embodiments of the disclosure.

FIG. 17 shows earlier stages of the example processing including a first stage of forming a poly-silicon layer, including circuit elements of the transistors 1701. A second stage includes forming gate lines 1703 in an M1 layer of all display pixels, and forming an xVcom line 1705 in the M1 layer of display pixels E-H. The xVcom lines of display pixels E-F include an expanded portion 1706 at middle sub-pixel to allow for connection to a common electrode. The xVcom lines of display pixels G-H act as drive tunnels that bypass the other conductive pathways in the sense region because no connection is made between the xVcom line and the other conductive pathways of the sense region (i.e., there is a bypass). Next, a connection layer (CON1) is formed including connections 1707 on transistor circuit elements of the display pixels, and on the expanded xVcom portion 1706. Data lines 1709 are formed in the M2 layer of the display pixels.

Figure 18:
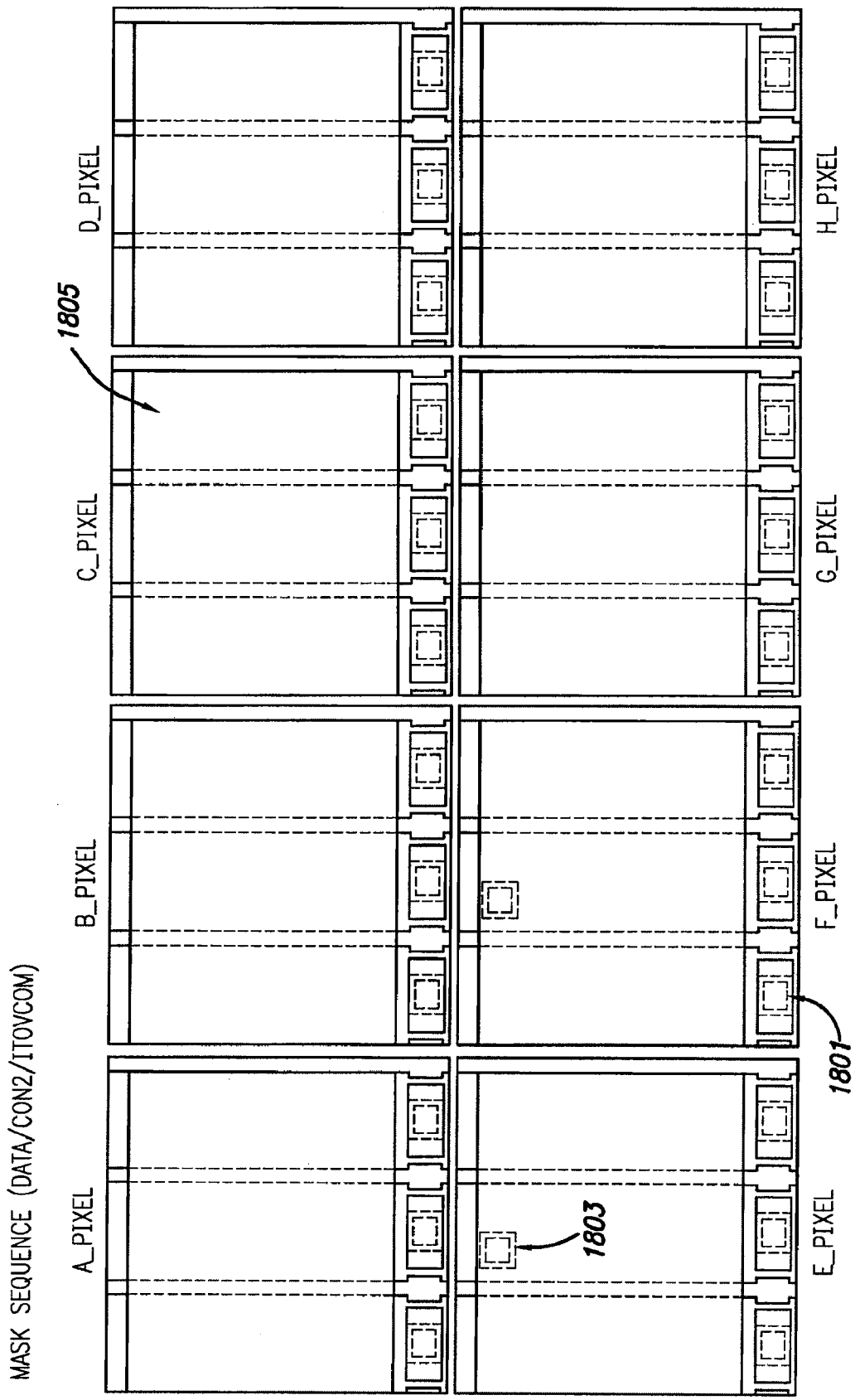

FIG. 18 shows middle stages of the example processing. For reference, the M2 layer is also shown. A second connection layer (CON2) is formed to connect the transistor drains to a common electrode (Vcom) 1805 with a connection 1801. Display pixels E-F include another connection 1803 in CON2 that connects xVcom 1705 to the common electrode 1805. Next, the common electrode 1805 may, for example, be formed of a substantially transparent conductor, such as ITO.

Figure 19:
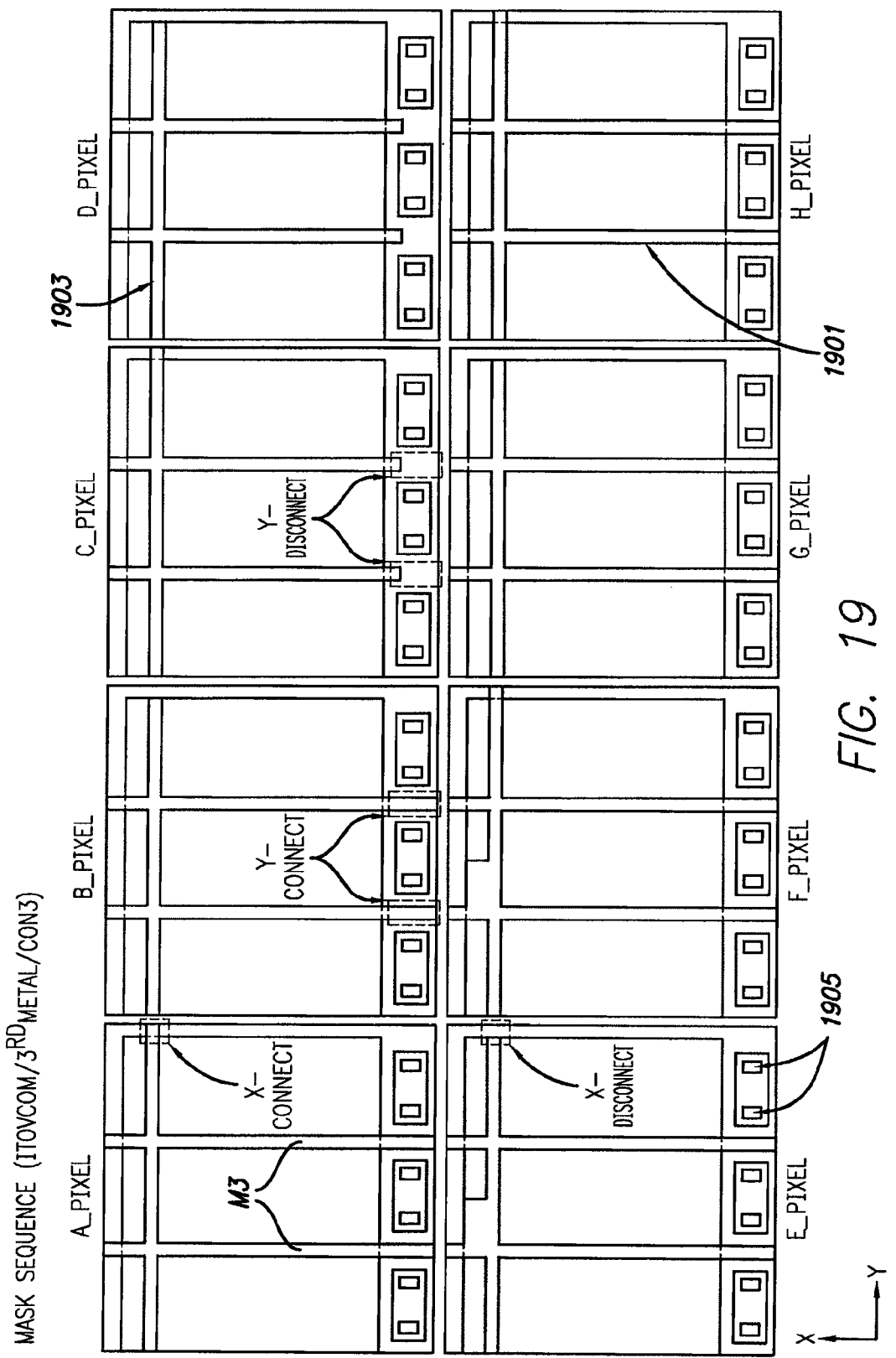

FIG. 19 shows later stages of the example processing, and shows the Vcom 1805 from prior processing for reference. In the processing shown in FIG. 19, a third metal (M3) layer and a third connection layer (CON3) are formed. The CON3 layer 1905 connects to display pixel electrodes. The M3 layer is formed in electrical contact with Vcom 1805. The M3 layers of each display pixel includes two vertical lines 1901 and one horizontal line 1903. In some embodiments, the M3 layer can serve the same purpose as a yVcom line in other embodiments. In general, in some embodiments the M3 layer can have certain advantages in that it can provide relatively low cross capacitance coupling between itself and the data/gate lines. Further, in the sense regions, the horizontal (x-direction) connection of the M3 layer can serve to couple all the sense common electrodes together to enhance the y-direction charge sensing. The x-y connections of the common electrodes in the sense region can be repeated in the drive region for uniformity. Yet further, by positioning the vertical M3 lines (y-direction) over the data lines, an enhanced aperture ratio may be achieved. Since the drive tunnel can still be used even with the M3 layer to bypass the sense regions, the horizontal (x-direction) of the M3 layer can be disposed over the drive tunnel and over any xVcom layer aligned therewith so as to increase the aperture ratio. In pixel embodiments in which no xVcom line is used, the stimulating drive line signal can be fed to the M3 layer. In general, the simulating drive line signal may be fed to one or both of the xVcom line and the M3 layer. Vertical lines 1901 in each display pixel may include y-disconnections or y-connections, depending on the particular display pixel of the set (i.e., A_pixel, B_pixel, etc.). A y-connection of the B_pixel and a y-disconnection of the C_pixel are highlighted in FIG. 19. Horizontal lines 1903 in each display pixel may include x-disconnections or x-connections, depending on the particular display pixel of the set. An x-connection of A_pixel and an x-disconnection of E_pixel are highlighted in FIG. 19. The vertical lines 1901 and horizontal lines 1903 of the M3 layer of display pixels A, F, and H extend to the edges (top, bottom, left, and right) of the display pixel, and can potentially connect display pixels A, F, and H to adjacent display pixels in each direction. Thus, display pixels A, F, and H provide x- and y-connections (x-con, y-con). Display pixels A, F, and H are labeled as x- and y-connected display pixels because the horizontal line 1903 of each display pixel forms a conductive pathway between adjacent display pixels on the right and left, and vertical lines 1901 of each display pixel form a conductive pathway between adjacent display pixels on the top and bottom. However, while display pixels A, F, and H have the connection structure to connect in both the x-direction and the y-direction, the display pixels are not necessarily connected to adjacent display pixels because one or more of the adjacent display pixels can include, for example, a disconnection in the M3 layer that disconnects the adjacent display pixel from pixel A, F, or H.

The M3 layer in each of display pixels B, E, and G extends fully in the vertical direction, but does not extend to the right edge of the display pixel. These display pixels provide x-disconnections and y-connections (x-discon, y-con). More specifically, display pixels B, E, and G are "right disconnected", i.e., they do not connect to the M3 layers of display pixels on their right. Likewise, the M3 layer of display pixel C provides x-connection and y-disconnection (x-con, y-discon), and more specifically, pixel C is "bottom disconnected." The M3 layer of display pixel D provides x- and y-disconnections (x-discon, y-discon), and more specifically, pixel D is "right and bottom disconnected". It should be noted that disconnections are not limited to right and/or bottom, but there could be disconnections at the top, left, or in the interior of the M3 layer of a display pixel, and in any number and combination.

FIG. 20 shows even later stages of the example processing. The M3 and CON3 layers are shown for reference. Display pixel electrodes 2001 and black masks (BM) 2003 are formed on all display pixels. In FIGS. 17-20, there is no yVcom line connectivity as there is in the embodiment of FIG. 5. Rather, the M3 layer can serve the purpose of connecting the common electrodes in the x and y directions. However, xVcom can still be used in some pixels, i.e., E, F, G, H, to provide a drive tunnel, i.e., a sense region bypass.

FIGS. 21A & 21B show an example layout of display pixels for one example touch pixel 2103. Touch pixel 2103 includes a region of 64×64 display pixels, each of the display pixels being one of display pixels A-H described above according to the legend of display pixels shown in the figure. FIG. 21A also shows an example touch screen 2101 including an example arrangement of 150 (15×10) touch pixels 2103. The display pixel layout creates groupings of display pixels that can substantially correspond to the drive region segments, sense regions, and grounding regions described above in reference to FIGS. 4 and 13. In particular, the layout of display pixels forms two X regions (X1 and X2), two Y regions (Y1 and Y2), and one Z region. The X1 and X2 regions can be, for example, a right-half portion of a drive region segment and a left-half portion of another drive region segment, such as right-half portion 309 and left-half portion 313, respectively, in FIG. 3. The Y regions can be, for example, portions of grounding regions such as drive-sense grounding region 1301 of FIG. 13. The Z region can be, for example, a portion of a sense region such as sense line 223 of FIG. 3. The particular configurations of the set of eight display pixels shown in FIGS. 17-20, along with the particular design pixel layout shown in FIGS. 21A and 21B, creates the grouping of circuit elements that can be used in a touch sensing system to detect touch.

As can be seen in light of the FIGS. 17-20, and the legend of FIG. 21A, display pixels from column 1-23, and display pixels from rows 1-64 are connected together in the M3 layer to form the drive region X1. Grounding region Y1 includes display pixels of columns 24-25, and rows 1-64. Sense region Z includes columns 26-39, rows 1-64. Grounding region Y2 includes display pixels of columns 40-41, and rows 1-64. Drive region X2 includes columns 42-64, rows 1-64.

Drive regions X1 and X2 are electrically connected together through circuit elements of display pixels of drive tunnels (bypasses) 2105. Drive tunnel 2105 includes display pixels E, H, G, and F. Referring to FIG. 20, display pixels E and F provide a "contact" between the M3 layer (at contact points 2005 of FIG. 20) through conductive layers Vcom ITO, CON2, M2, and CON1 to connect with xVcom in the M1 layer, as seen in the figures. Thus, display pixels E and F allow the M3 layer of a drive region to bypass a grounding and sense regions by tunneling (creating an out-of-layer/out-of-plane bypass to the xVcom (M1) layer).

Display pixels G and H include circuit element xVcom, and do not include a connection between xVcom and any of the other circuit elements of the display pixels that operate in the touch sensing system described in more detail below. Thus, display pixels type G and H are examples of tunneling connections that bypass grounding and sense regions to connect together two drive regions e.g., drive regions X1 and X2.

Referring again to FIGS. 17-20, the three example types of display pixels, connection layer type, contact type, and tunnel type, will now be described in more detail with reference to the example display pixel layout of FIGS. 21A and 21B. In this example, the common electrodes of the display pixels in each region are connected together primarily through the M3 layer, which is referred to as a connection layer herein. A_pixels, B_pixels, C_pixels, and D_pixels are connection layer type display pixels, which can serve the common function of connecting together the common electrodes of the display pixels through the connection layer. In particular, as described above vertical lines 1901 and horizontal lines 1903 are electrically connected to the common electrodes of the display pixels. The four different M3 layer configurations of the connection layer type display pixels provide four different ways to connect the M3 layer between display pixels. A_pixels can connect the M3 layer in all adjacent display pixels (top, bottom, left, and right). B_pixels can connect to the top, bottom, and left, but provides a disconnection from display pixels to the right. C_pixels can connect to the top, left, and right, but provides a disconnection from display pixels below. D_pixels can connect to the top and left, but provides a disconnection from display pixels to the right and display pixels below. Referring to FIG. 21A, the majority of display pixels of the display pixel layout can be A_pixels, which typically can be located in interior areas of regions to connect all adjacent pixels efficiently.

B_pixels, C_pixels, and D_pixels can be located at the boundaries of regions because the x- and y-disconnections of these display pixels can provide the disconnection that forms the boundaries of regions. For example, the right-disconnected B_pixels can be arranged in vertical lines, as shown in FIG. 21A, to separate regions left and right. C_pixels can be arranged in horizontal lines, as shown in FIG. 21A, to separate regions above and below. D_pixels can be placed in the corners of regions to separate regions left and right and above and below.

Using pixels A-D alone, it is possible to form the drive region segments, the sense line, and the grounding regions shown in FIG. 21A. In some embodiments of the disclosure, however, drive region segments are electrically connected together through conductive pathways that bypass other regions, such as the grounding regions and the sense region. The contact type display pixels, i.e., E_pixels and F_pixels, and the tunnel type display pixels, i.e., G_pixels and H_pixels, can form conductive pathways bypassing other regions. The contact type pixels can electrically connect or disconnect two or more conductive layers in the stackup of the display pixel. The example contact type display pixels described herein include a connection between the M3 layer and an xVcom line, which can be formed in a first metal layer (M1 layer). Thus, the contact type pixels form an out-of-plane/layer bypass by connecting the connection layer (M3 layer) of a drive region segment to a different conductive pathway, the xVcom line in the M1 layer. The tunnel type display pixels include the xVcom line, but do not include a connection between the xVcom line and any other circuit element of the display pixel stackup, such as the M3 layer.

The bypassing conductive pathways will now be described in more detail. As shown in FIGS. 21A and 21B, touch pixel 2103 includes three drive tunnels 2105. Each drive tunnel 2105 includes display pixels in the following pattern of pixel types: E, H, G, H, . . . H, G, H, G, F. A drive tunnel 2105 is one example of a bypassing conductive pathway. Starting at the left end of drive tunnel 2105, the bypassing conductive pathway begins with an E_pixel, which includes a right-disconnection in the connection layer to disconnect the connection layer between the drive region segment and the grounding region in FIG. 21. Consequently, the right disconnection of the E_pixel results in a +x-disconnection in the connecting layer between the two drive region segments, and the out-of-plane/layer connection of the E_pixel results in an x-connection in another layer (M1) between the two drive region segments.

Once the out-of-plane/layer connection to the other layer is made, the bypassing conductive pathway runs through the other regions, i.e., the grounding regions and the sense region, using the tunnel type display pixels. The tunnel type display pixels each include the xVcom line and alternatively include an x-disconnection and an x-connect. More specifically, the G_pixels include a right disconnection, and the H_pixels include a right connect. The x-connect/disconnect of the tunnel type display pixels can, for example, allow more than one other region to be formed between the two drive region segments. In particular, as shown in FIG. 21 the G_pixels can be formed in a vertical column of B_pixels to create disconnections to form the border between grounding region Y1 and sense region Z, the border between sense region Z and grounding region Y2, and the border between grounding region Y2 and drive region segment X2. H_pixels can be located in interior areas of the other regions, such as the grounding regions and the sense region because the connection layer (M3 layer) of the H_pixels connects to all adjacent pixels, similar to the A_pixels.

FIGS. 22-1 and 22-2 show an example touch pixel layout and touch screen 2201 according to embodiments of the disclosure. Touch screen 2201 includes an LCD FPC (flexible printed circuit board) that connects 2201 to LCD circuitry (not shown), an LCD drive that drives the display pixels in a display phase, a Vcom line carrying a common voltage for the touch screen. The Touch FPC includes the following lines: r0-r14 and r14-r0 lines that transmit drive signals to the drive regions, c0-c9 lines that receive sense signals from the sense regions, tswX, tswY, and tswZ (sometimes referred to as "tswX,Y,Z" herein) lines that connect to a touch switch (TSW) that can control various switching, such as switching from connecting all data lines to a virtual ground in a touch phase to connecting the respective data lines to corresponding data outputs from LCD drive during a display phase, switching between sense regions during the touch sense phase, etc. The Touch FPC also includes g1 and g0 lines for connecting data lines and grounding regions, respectively, to virtual grounds. Gate drivers that drive gate lines are included.

FIG. 22-2 also shows a side view of touch screen 2201. The side view illustrates some of the connections in more detail. For example, FIG. 22-2 shows M3 connections from Y regions allow those regions to be grounded to g0. M3 connections from Z regions allow the Z regions to be connected to c0-c9 lines. M2 connections allow data lines to be grounded to g1 during the touch sensing phase.

Figure 23:
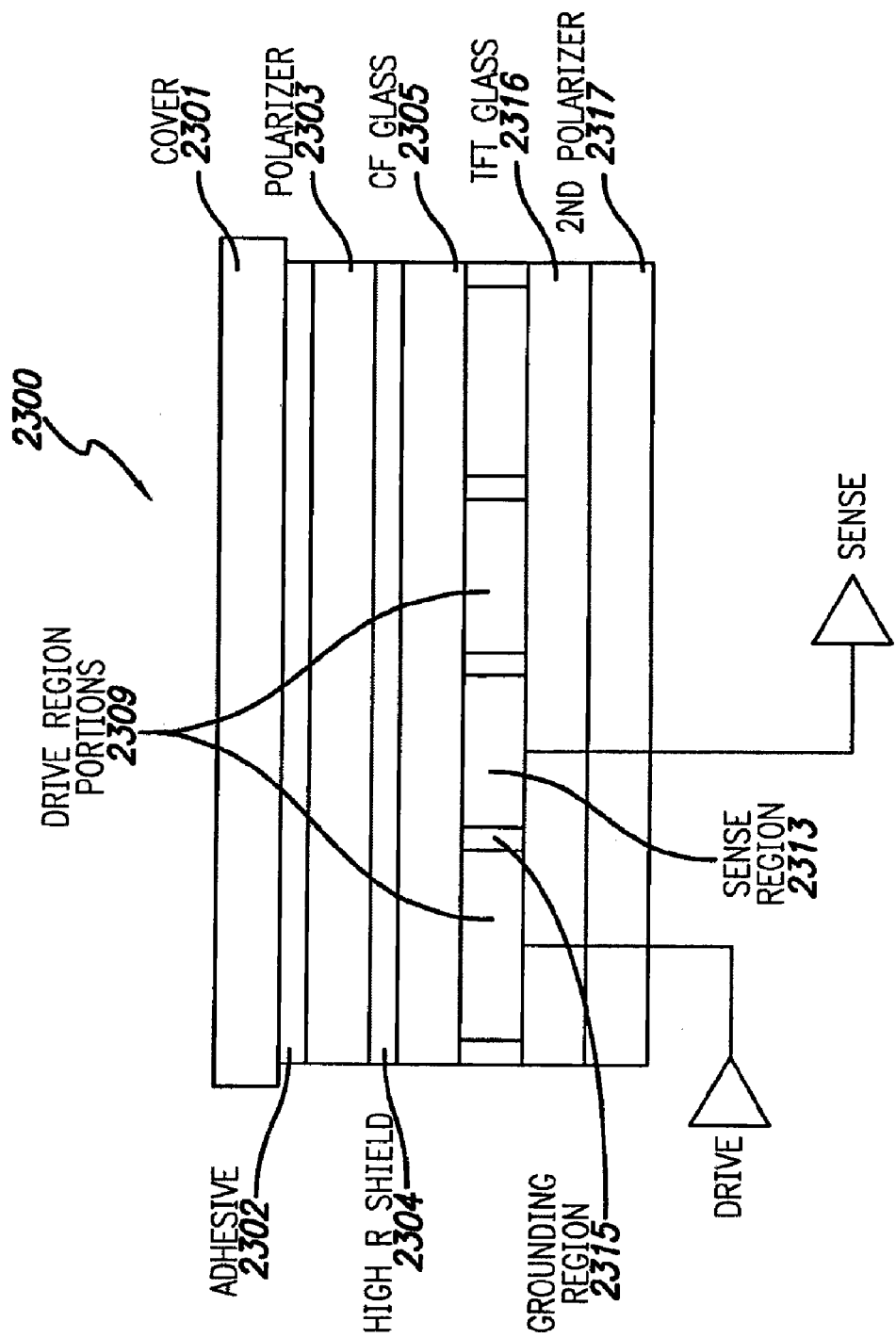
FIG. 23 is a side view of an example touch screen including a high resistance (R) shield according to embodiments of the disclosure.

FIG. 23 is a side view of an example touch screen including a high resistance (R) shield according to embodiments of the disclosure. FIG. 23 shows a portion of a touch screen 2300, including a cover 2301, an adhesive 2302, a polarizer 2303, a high resistance (R) shield 2304, a color filter glass 2305, drive regions 2309, sense region 2313, grounding region 2315, a TFT glass 2316, and a second polarizer 2317. The liquid crystal layer can be disposed below the color filter glass. A high resistance shield, such as high R shield 2304, may be placed between a CF glass and a front polarizer in place of a low resistivity shielding layer for a FFS LCD, for example. The sheet resistance of the high R shield may be, for example, 200M Ohm/square~2 G Ohm/square. In some embodiments, a polarizer with high resistivity shielding film may be used as a high R shielding layer, thus replacing polarizer 2303 and high R shield 2304 with a single high R shielding polarizer, for example. A high R shield may help block low frequency/DC voltages near the display from disturbing the operation of the display. At the same time, a high R shield can allow high-frequency signals, such as those typically used for capacitive touch sensing, to penetrate the shield. Therefore, a high R shield may help shield the display while still allowing the display to sense touch events. High R shields may be made of, for example, a very high resistance organic material, carbon nanotubes, etc.

Figure 24:
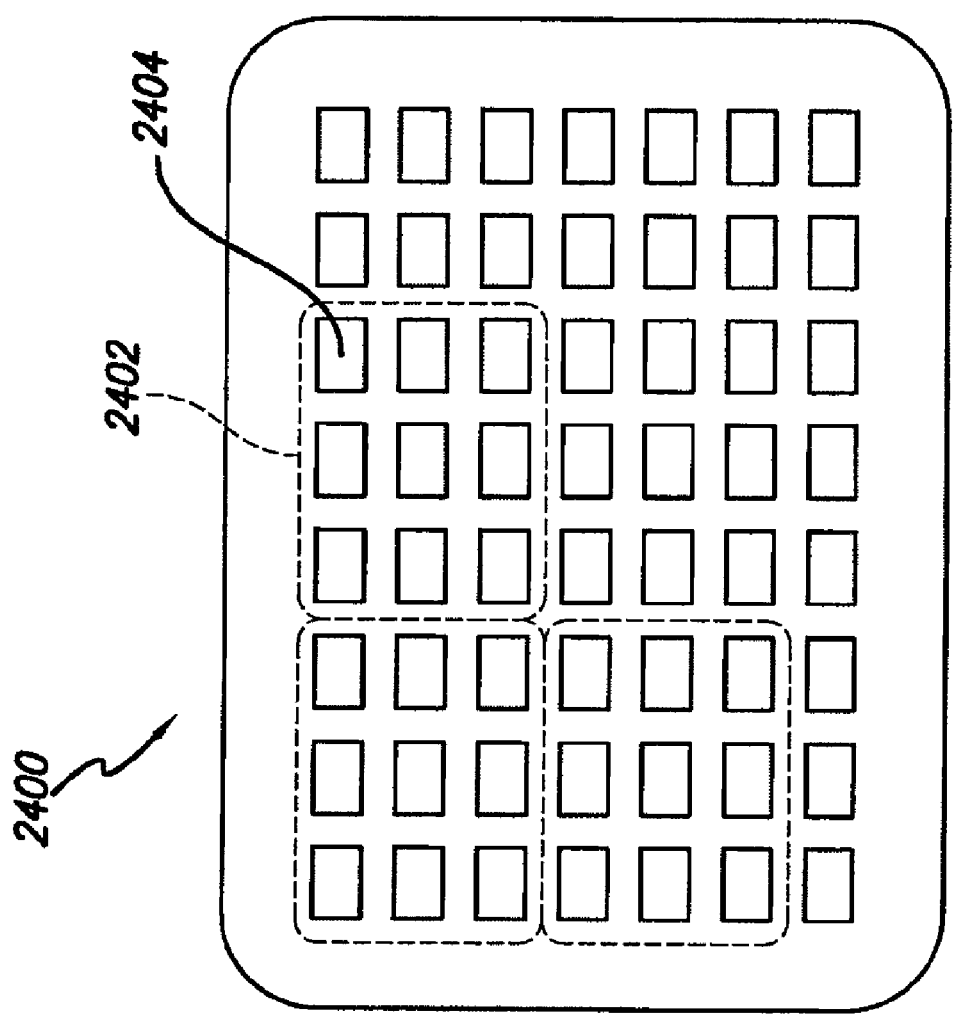
FIG. 24 is a partial top view of another example integrated touch screen in accordance with embodiments of the disclosure.

FIG. 24 is a partial top view of another example capacitive-type integrated touch screen 2400, in accordance with embodiments of the disclosure. This particular touch screen 2400 is based on self capacitance and thus it includes a plurality of touch sensing regions 2402, which each represent different coordinates in the plane of touch screen 2400. Touch pixels 2402 are formed of display pixels 2404 that include multi-function circuit elements that operate as part of the display circuitry to display an image on touch screen 2400 and as part of a touch sensing circuitry to sense a touch on or near the touch screen. In this example embodiment, the touch sensing circuitry and system operate based on self capacitance, thus, the self capacitance of the circuit elements in a touch pixel 2402. In some embodiments, a combination of self capacitance and mutual capacitance may be used to sense touch.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, one or more of the functions of computing system 200 described above can be performed by firmware stored in memory (e.g. one of the peripherals 204 in FIG. 2) and executed by touch processor 202, or stored in program storage 232 and executed by host processor 228. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

What is claimed is:
1. A stackup of a plurality of display pixels, the stackup comprising:
first, second, third and fourth, and fifth regions each having a plurality of display pixels, the plurality of display pixels having circuit elements, the first, second, third and fourth, and fifth regions arranged in order along a first direction; and wherein:

circuit elements of the display pixels in the first region being electrically connected together;

circuit elements of the display pixels in the fifth region being electrically connected together;

the second region disposed between the first and third regions and comprising a grounding region;

the fourth region disposed between the third and fifth regions and comprising a grounding region;

wherein at least one conductive pathway connects circuit elements of the first region to circuit elements of the fifth region wherein the at least one conductive pathway is disposed across the display pixels of the second, third and fourth regions without electrically connecting to the circuit elements of the second, third or fourth regions.

2. The stackup of claim 1, wherein the at least one conductive pathway is disposed under at least a portion of the circuit elements of the display pixels.

3. The stackup of claim 1, further comprising:

a plurality of gate lines;

a plurality of data lines, the plurality of data lines electrically insulated from the plurality of gate lines; and wherein the circuit elements of the first region are electrically connected together by first conductive lines, and the circuit elements of the fifth region are electrically connected together by second conductive lines, and the first conductive lines and the second conductive lines are electrically insulated from the plurality of gate lines and the plurality of data lines.

4. The stackup of claim 1, wherein first conductive lines are disposed alone the first and a second direction, and the second conductive lines are disposed along the first and second directions.

5. The stackup of claim 4, wherein the circuit elements of the display pixels in the third region are electrically connected at least along the second direction.

6. The stackup of claim 1, wherein the first and fifth regions comprise drive regions, the third region comprises a sense region.

7. The stackup of claim 1, wherein the second and fourth regions include conductors that connect circuit elements of display pixels within the second and fourth regions to a common ground.

8. The stackup of claim 7, wherein the common ground is an AC ground.

9. A stackup of a plurality of display pixels, the stackup comprising:

first, second, third and fourth, and fifth regions each having a plurality of display pixels, the plurality of display pixels having circuit elements, the first, second, third and fourth, and fifth regions arranged in order along a first direction; and wherein:

circuit elements of the display pixels in the first region being electrically connected together;

circuit elements of the display pixels in the fifth region being electrically connected together;

the second region disposed between the first and third regions and comprising means for reducing static capacitance between the first and third regions;

the fourth region disposed between the third and fifth regions and comprising means for reducing static capacitance between the third and fifth regions;

wherein at least one conductive pathway connects circuit elements of the first region to circuit elements of the fifth region wherein the at least one conductive pathway is disposed across the display pixels of the second, third and fourth regions without electrically connecting to the circuit elements of the second, third or fourth regions.

10. The stackup of claim 9, wherein the means for reducing static capacitance between the first and third region and the means for reducing static capacitance between the third and fifth regions comprises conductors for grounding circuit elements of plural display pixels within the second and third regions.

11. The stackup of claim 9, wherein each display pixel comprises a pixel electrode and a common electrode disposed in a fringe field switching arrangement.

12. A touch screen integrated with a display comprising:

a plurality of display pixels having circuit elements, the display pixels arranged along first and second directions;

a plurality of drive lines including circuit elements of some of the plurality of display pixels disposed along the first direction and including at least a first and fifth regions of display pixels;

a plurality of sense lines including circuit elements of others of the plurality of display pixels disposed at least along the second direction, crossing the first direction and forming a third region of display pixels, the third region disposed between the first and fifth regions along the first direction;

a conducting member for interconnecting at least some of the circuit elements of the first region;

a conducting member for interconnecting at least some of the circuit elements of the fifth region;

a second region of display pixels being distinct from display pixels of the first, third and fifth regions, the second region disposed between the first and third regions along the first direction and comprising a first grounding region;

a fourth region of display pixels being distinct from the first, second, third and fifth regions, the fourth region disposed between the third and fifth regions along the first direction and comprising a second grounding region; and a conductor electrically connecting at least some circuit elements of the first region with at least some circuit elements of the fifth region, the conductor disposed across and electrically bypassing circuit elements of the second, third and fourth regions of circuit elements.

13. The touch screen as recited in claim 12, wherein each of the plurality of drive lines includes circuit elements of the display pixels arranged along the first and second directions and each of the plurality of sense lines includes circuit elements of the display pixels arranged along the first and second directions.

14. The touch screen as recited in claim 12, wherein the display comprises a liquid crystal display.

15. The touch screen as recited in claim 14, wherein the circuit elements of the display pixels of the first, second, third, fourth and fifth regions comprise common electrodes of the liquid crystal display.

16. The touch screen as recited in claim 14, wherein the conducting member for interconnecting at least some of the circuit elements of the first region interconnects common electrodes of the liquid crystal display within the first region along both the first and second directions and the conducting member for interconnecting at least some of the circuit elements of the fifth region interconnects common electrodes of the liquid crystal display within the fifth region along both the first and second directions.

17. The touch screen as recited in claim 12, wherein
display pixels within the first, second, third, fourth and fifth regions are configured to operate as display pixels during a display mode of operation;
at least some of the display pixels within the first and third regions are configured to be capacitively coupled together during a touch sensing mode of operation;
at least some of the display pixels within the third and fifth regions are configured to be capacitively coupled together during the touch sensing mode of operation; and
circuit elements within the third region are coupled to capacitance measuring circuitry during the touch sensing mode of operation.

18. A computer system comprising:
a processor;
a memory;
a display system including
  display circuitry that includes a plurality of circuit elements within display pixels, the display pixels grouped into a plurality of first, second and third regions, and
  a display controller;
a touch sensing system including
  touch sensing circuitry that includes the plurality of circuit element, a plurality of first regions serving as drive regions, the plurality of second regions serving as sense regions and the plurality of third regions serving as grounding regions; the first, second and third regions arranged in repeated order of a drive region, a grounding region, a sense region and a grounding region along a first direction;
  a conducting member for electrically connecting circuit elements of a plurality of first regions, the conducting member disposed across and electrically bypassing the second and third regions;
  the circuit elements of each of the first regions being electrically connected together along the first direction and along a second direction; and
  a touch controller.

19. The computer system as recited in claim 18, wherein the circuit elements of each of the third regions are electrically connected together along the first direction and along the second direction.

20. A method of manufacturing an integrated touch screen having a plurality of display pixels, and circuit elements of the display pixels, the method comprising:
forming a first line segment in a first, drive region of the touch screen, the first region including plural display pixels and the first line segment interconnecting circuit elements of the display pixels in the first region;
forming a second line segment in a second, drive region of the touch screen that is separated from the first region by a third, sense region and a fourth and fifth grounding regions of the touch screen, the second, third, fourth and fifth regions including plural display pixels, and the second line segment interconnecting circuit elements of the display pixels in the second region; and
forming a conductive pathway between the first and second regions, the conductive pathway disposed across display pixels the third, fourth and fifth regions without making electrical contact to the circuit elements within the third, fourth and fifth regions, the conductive pathway electrically connecting the first line segment and the second line segment.

21. The method of claim 20, wherein the circuit elements comprise common electrodes of the display pixels.

22. A touch screen having a plurality of display pixels, and circuit elements of the display pixels, the touch screen comprising:
a first conductive member in a first, drive region of the touch screen, the first region including plural display pixels and the first conductive member interconnecting circuit elements of the display pixels in the first region;
a second conductive member in a second, drive region of the touch screen that is separated from the first region by a third, sense region and a fourth and fifth grounding regions of the touch screen, the second, third, fourth and fifth regions including plural display pixels, and the second conductive member interconnecting circuit elements of the display pixels in the second region; and
a conductive pathway between the first and second regions, the conductive pathway passing disposed across pixels the third, fourth and fifth regions without making electrical contact to the circuit elements within the third, fourth and fifth regions, the conductive pathway electrically connecting the first conductive member and the second conductive member.

23. The method of claim 22, wherein the circuit elements comprise common electrodes of the display pixels.

* * * * *